(12) United States Patent
Ohara et al.

(10) Patent No.: US 7,318,974 B2
(45) Date of Patent: Jan. 15, 2008

(54) POLYMER ELECTROLYTE FUEL CELL

(75) Inventors: Hideo Ohara, Katano (JP); Hiroki Kusakabe, Sakai (JP); Tatsuto Yamazaki, deceased, late of Moriguchi (JP); by Masayo Sugou, legal representative, Tokyo (JP); Nobuhiro Hase, Neyagawa (JP); Shinsuke Takeguchi, Kadoma (JP); Yoshiaki Yamamoto, Katano (JP); Toshihiro Matsumoto, Ibaraki (JP); Satoru Fujii, Takatsuki (JP); Kazuhito Hatoh, Osaka (JP); Masato Hosaka, Osaka (JP); Junji Niikura, Hirakata (JP); Kazufumi Nishida, Moriguchi (JP); Teruhisa Kanbara, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 221 days.

(21) Appl. No.: 10/118,628

(22) Filed: Apr. 9, 2002

(65) Prior Publication Data

US 2003/0003345 A1     Jan. 2, 2003

Related U.S. Application Data

(63) Continuation of application No. PCT/JP01/06955, filed on Aug. 10, 2001.

(30) Foreign Application Priority Data

Aug. 17, 2000   (JP)  ............................. 2000-247808
Aug. 17, 2000   (JP)  ............................. 2000-247809
Aug. 21, 2000   (JP)  ............................. 2000-249339
Oct. 18, 2000   (JP)  ............................. 2000-317437

(51) Int. Cl.
    *H01M 2/18*     (2006.01)

(52) U.S. Cl. .......................................... 429/38; 429/34
(58) Field of Classification Search .................. 429/34, 429/35, 36, 38, 39
See application file for complete search history.

(56) References Cited

U.S. PATENT DOCUMENTS 4,364,995 A     12/1982    Crawford et al.

(Continued)

FOREIGN PATENT DOCUMENTS

CA            2 318 993 A1     6/2000

(Continued)

*Primary Examiner*—Tracy Dove
(74) *Attorney, Agent, or Firm*—McDermott Will & Emery LLP

(57) ABSTRACT

A polymer electrolyte fuel cell of the present invention includes a hydrogen ion-conductive polymer electrolyte membrane, an anode and a cathode sandwiching the hydrogen ion-conductive polymer electrolyte membrane, an anode-side conductive separator plate having a gas flow channel for supplying a fuel gas to the anode, and a cathode-side conductive separator plate having a gas flow channel for supplying an oxidant gas to the cathode. Each of the anode-side conductive separator plate and the cathode-side conductive separator plate is rectangle in shape and has an oxidant gas manifold aperture for an inlet arranged on one short side thereof, an oxidant gas manifold aperture for an outlet arranged on the other short side thereof, a fuel gas manifold aperture for an inlet and a fuel gas manifold aperture for an outlet arranged on different longitudinal sides thereof, and a cooling water manifold aperture for an inlet and a cooling water manifold aperture for an outlet arranged on the different longitudinal sides thereof. The respective fuel gas manifold apertures are disposed opposite to the cooling water manifold apertures. The oxidant gas manifold apertures, the fuel gas manifold apertures, and the cooling water manifold apertures have openings of different shapes.

19 Claims, 20 Drawing Sheets

U.S. PATENT DOCUMENTS 5,230,966 A * 7/1993 Voss et al. .................... 429/26
5,683,828 A * 11/1997 Spear et al. .................. 429/13
5,840,414 A    11/1998 Bett et al.
6,159,629 A * 12/2000 Gibb et al. .................... 429/39

FOREIGN PATENT DOCUMENTS

| | | |
|---|---|---|
| DE | 197 43 067 A1 | 4/1999 |
| EP | 0 955 686 A | 11/1999 |
| EP | 1 231 657 A | 8/2002 |
| JP | 5-66875 | 9/1993 |
| JP | 8-138692 A | 5/1996 |
| JP | 9-35726 A | 2/1997 |
| JP | 9-283166 A | 10/1997 |
| JP | 10-6513 A | 1/1998 |
| JP | 10-55813 A | 2/1998 |
| JP | 10-223238 A | 8/1998 |
| JP | 11-271701 A | 10/1999 |
| JP | 2000-21420 A | 1/2000 |
| JP | 2001-102072 | 4/2001 |
| WO | WO 99/27590 A | 6/1999 |
| WO | WO 01/35477 * | 5/2001 |

* cited by examiner

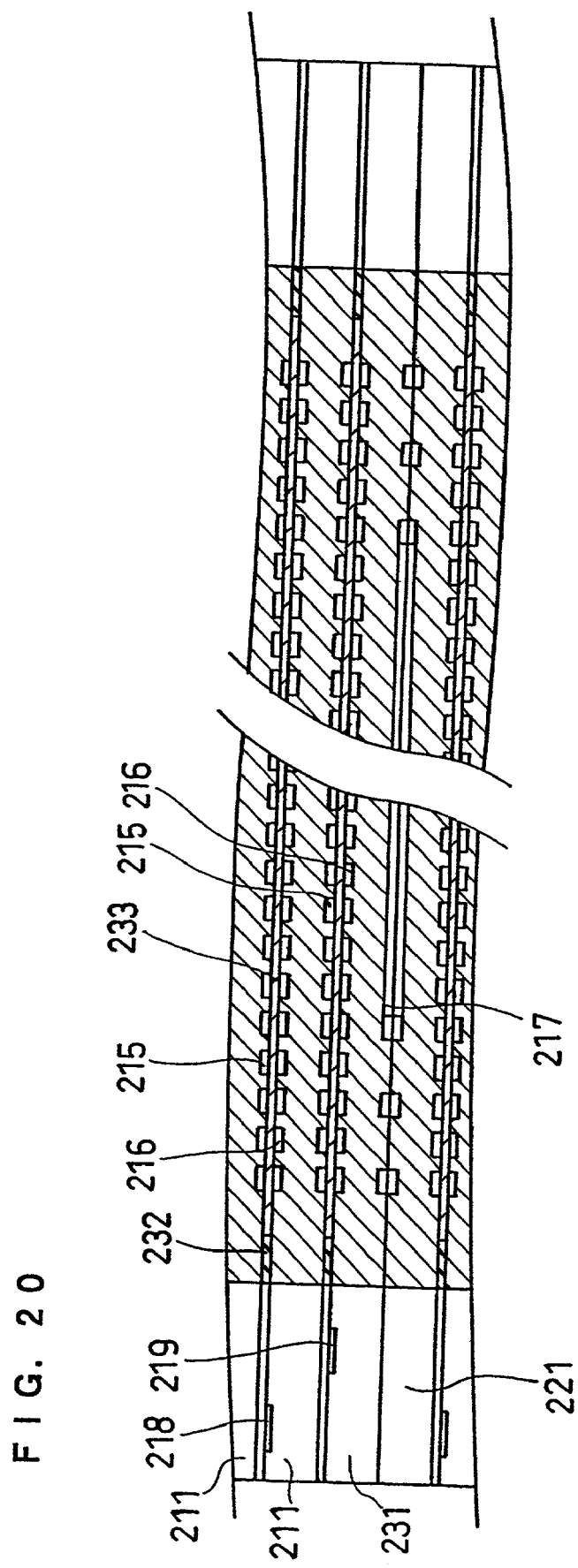

F I G. 2 1
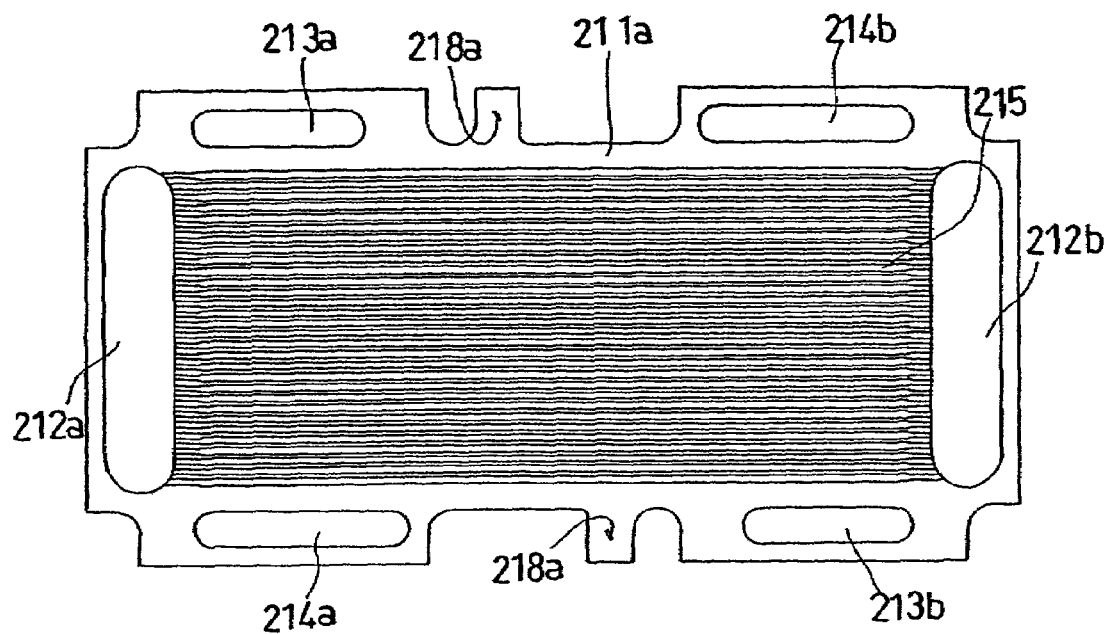
F I G. 2 2
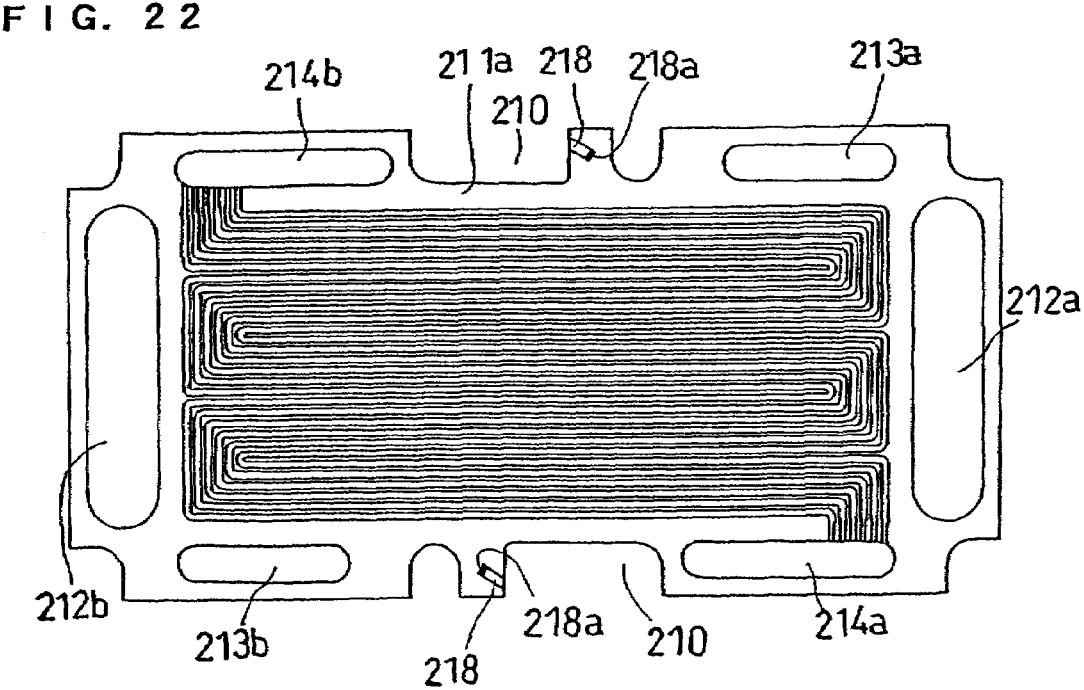

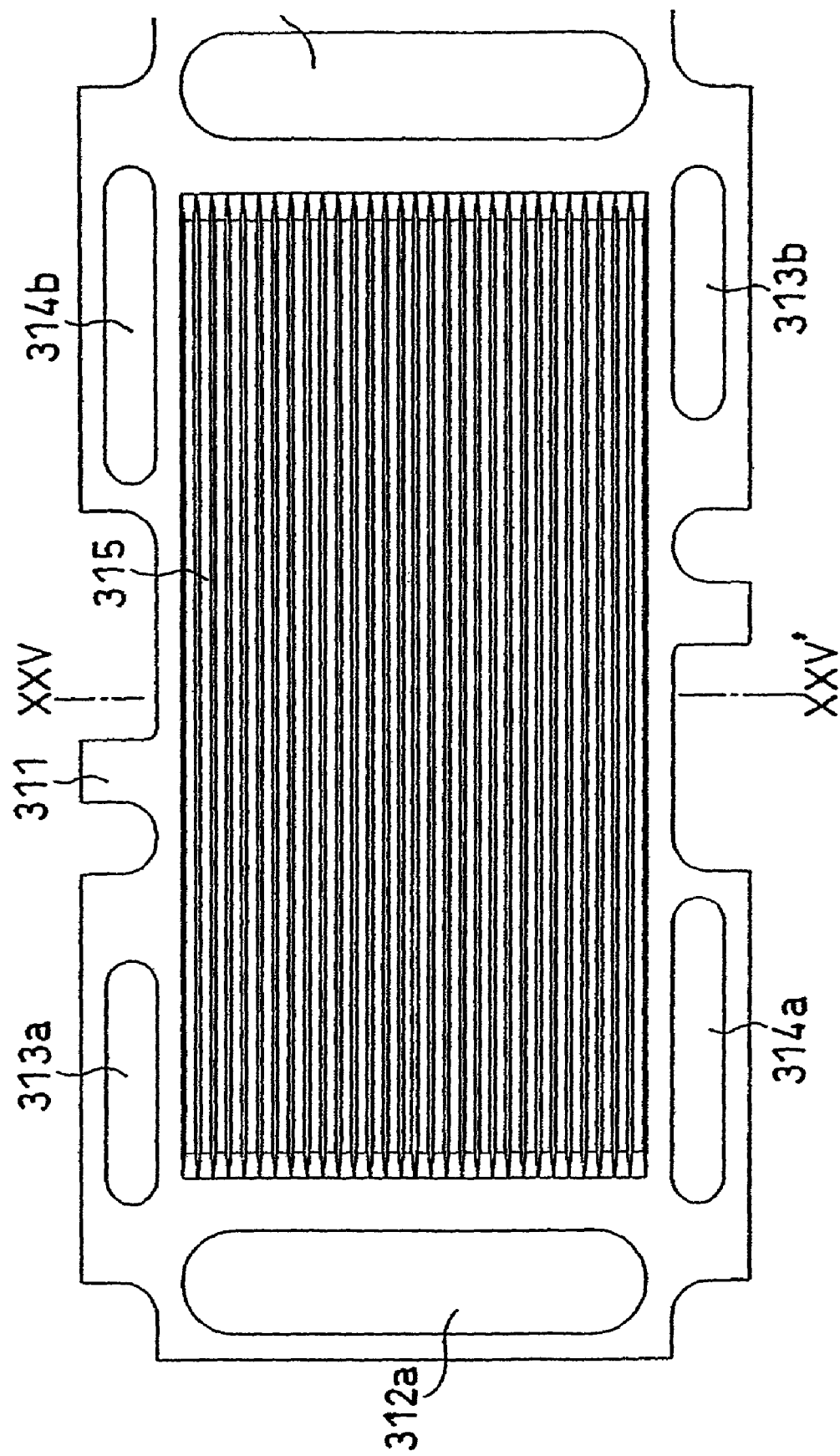
F I G. 2 6

FIG. 27
(a) 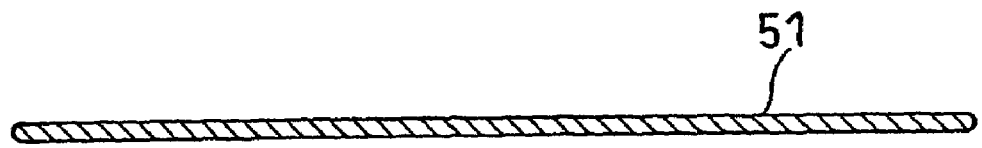
(b) 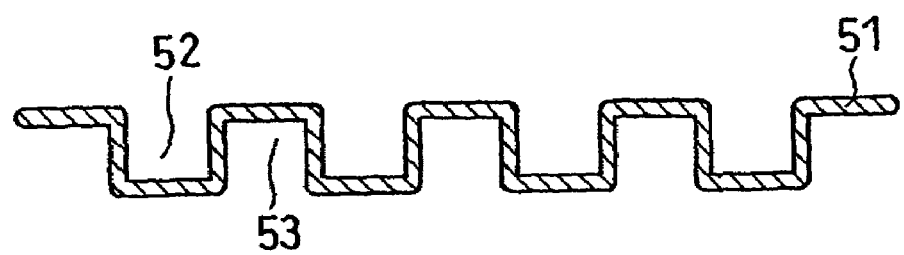
(c) 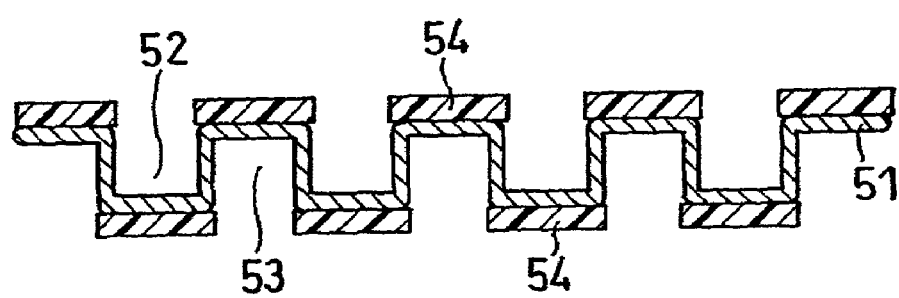
(d) 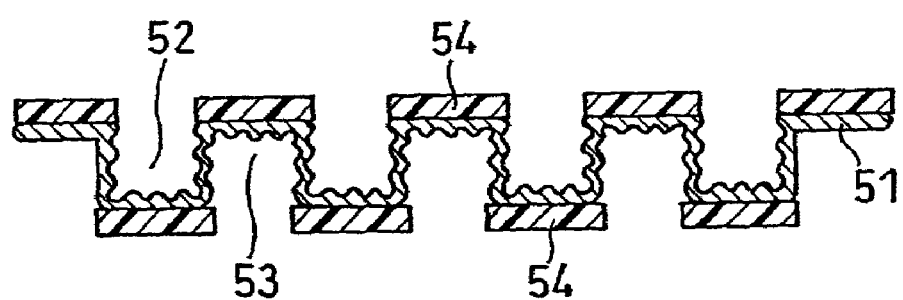
(e) 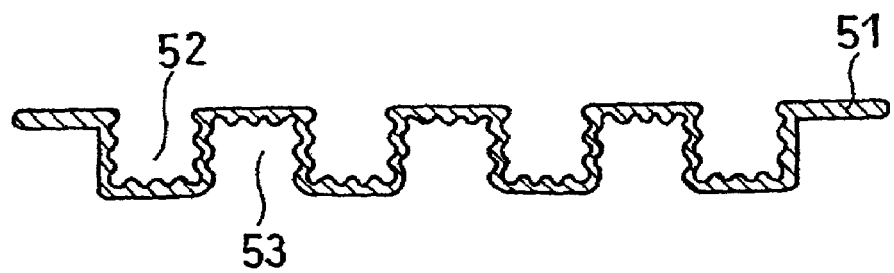

F I G. 2 8
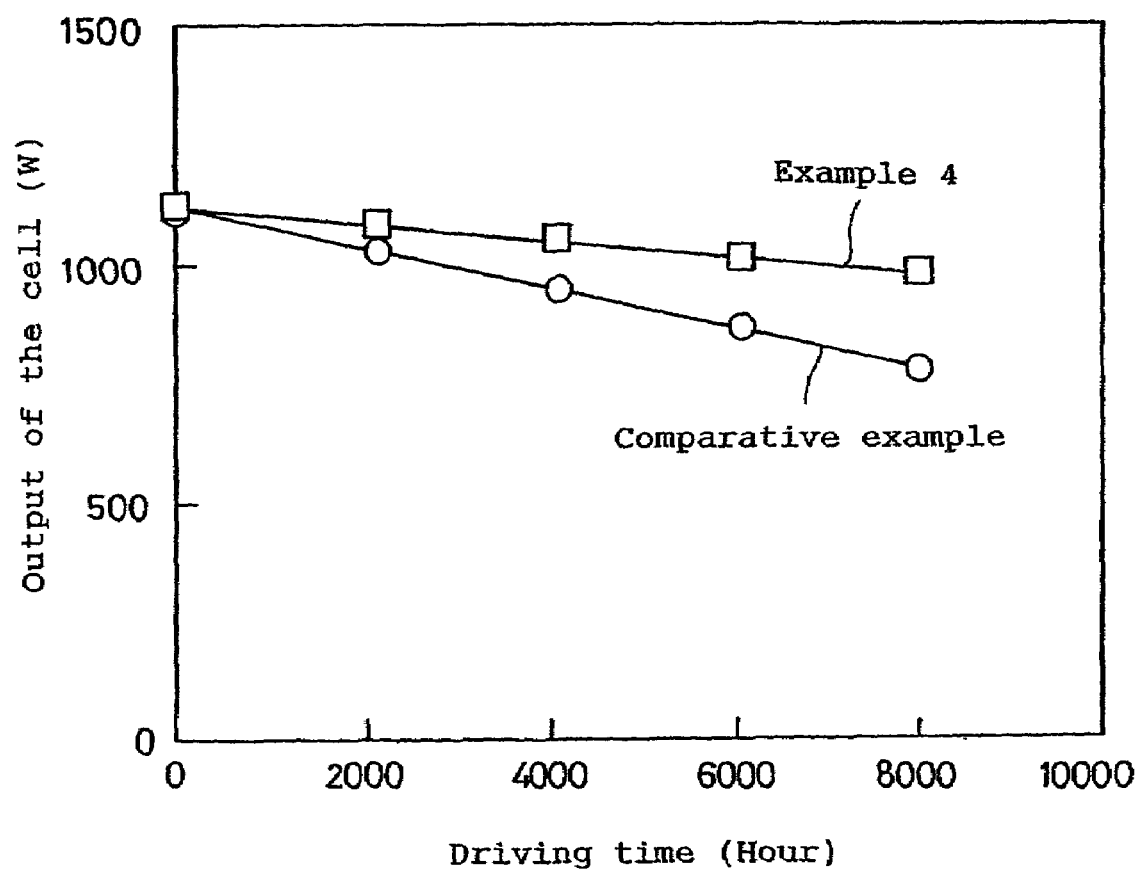

FIG. 29
(a) 
(b) 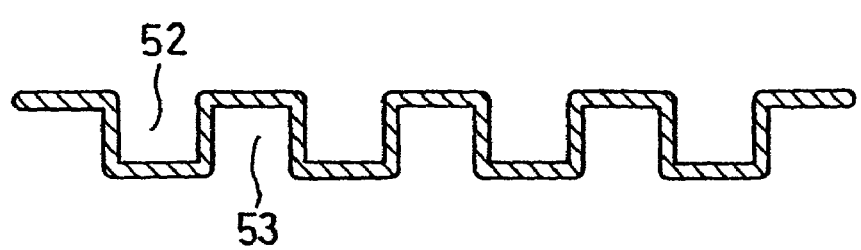
(c) 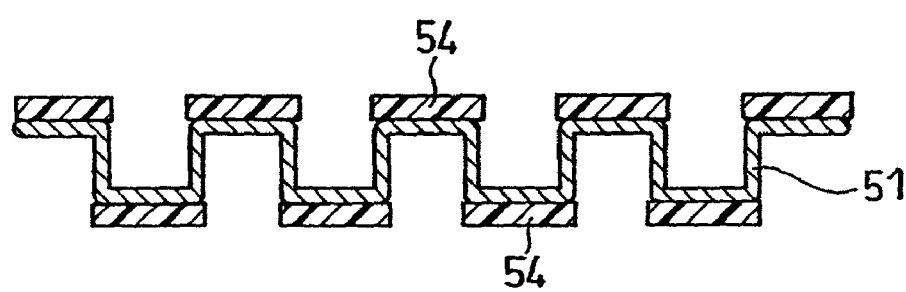
(d) 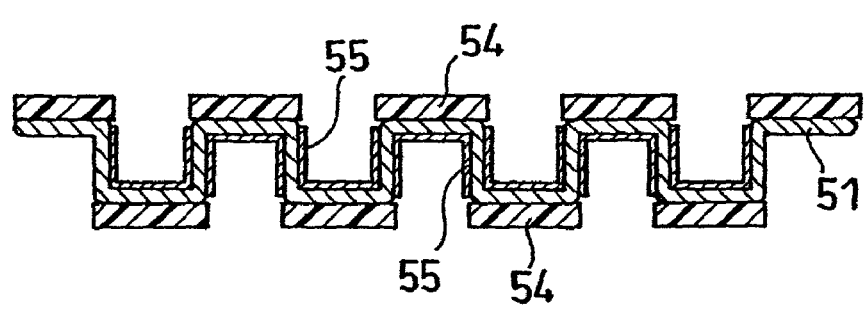
(e) 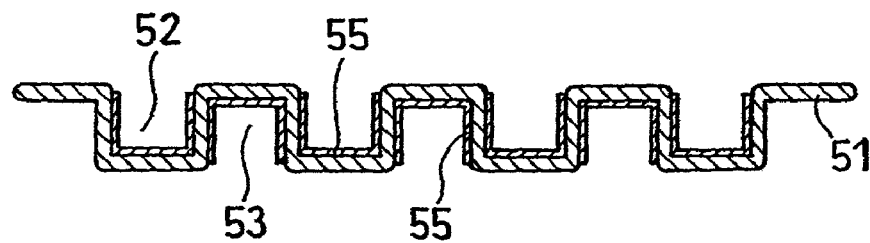

FIG. 30
(a) 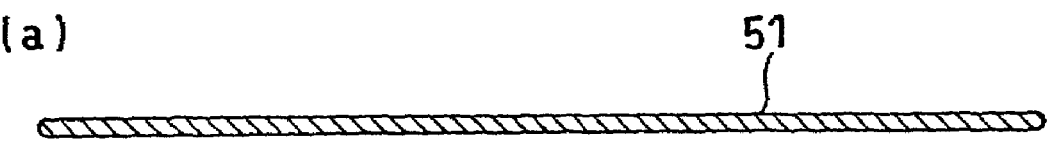
(b) 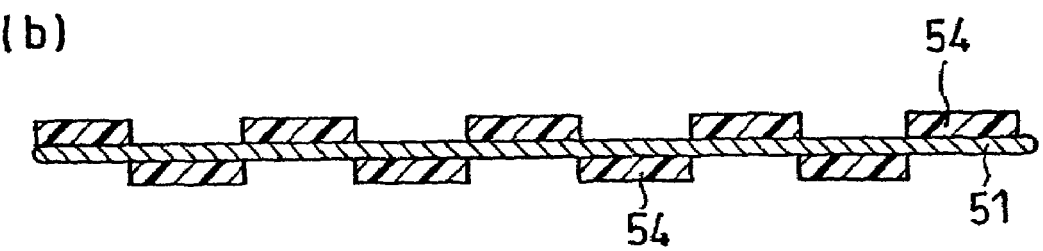
(c) 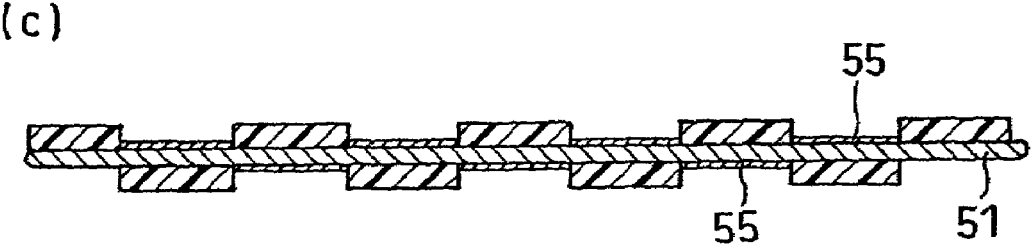
(d) 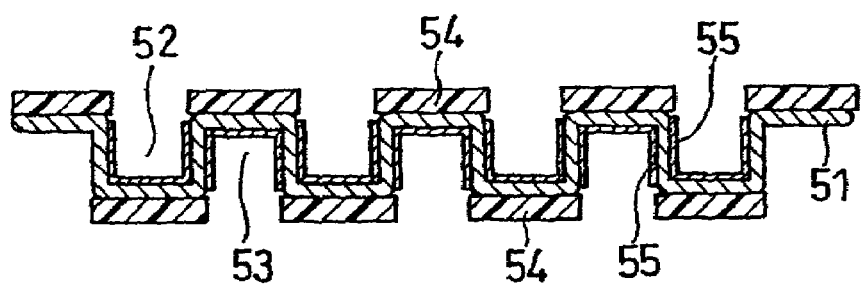
(e) 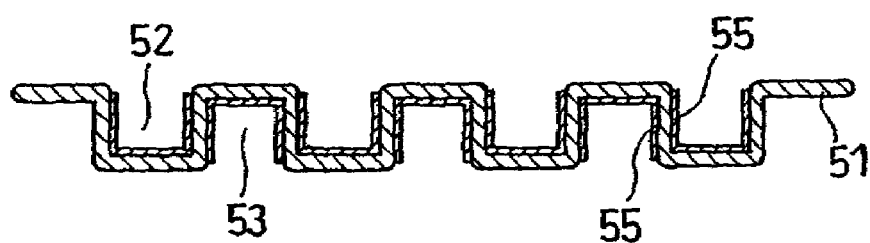

F I G. 3 1
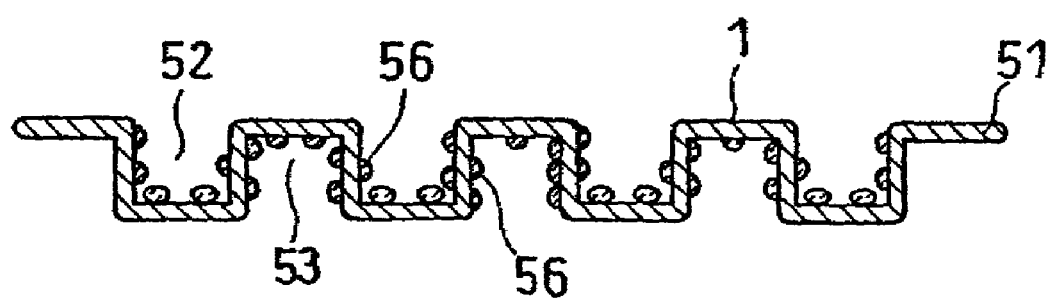

POLYMER ELECTROLYTE FUEL CELL

This application is, in accordance 35 U.S.C. § 111(a), a continuation of International Application No. PCT/JP01/06955, filed on Aug. 10, 2001.

TECHNICAL FIELD

The present invention relates to a polymer electrolyte fuel cell applicable for portable power sources, power sources for electric vehicles, and domestic cogeneration systems.

BACKGROUND ART

Fuel cells using a polymer electrolyte generate electric power and heat simultaneously by electrochemically reacting a fuel gas containing hydrogen and an oxidant gas containing oxygen, such as air. The fuel cell basically includes a polymer electrolyte membrane that selectively transports hydrogen ions and a pair of electrodes disposed on both faces of the electrolyte membrane. The electrodes comprises a catalyst layer mainly composed of carbon power with a platinum group metal catalyst carried thereon and a gas diffusion layer which has gas permeability and electronic conductivity and is formed on the outer face of the catalyst layer.

In order to prevent leakage of the supplied fuel gas and oxidant gas or mixing of the two gases, gas sealing members or gaskets are arranged on respective outer circumferences of the electrodes across the polymer electrolyte membrane. The sealing members or the gaskets are integrated with the electrodes and the polymer electrolyte membrane beforehand. This is called MEA (electrolyte membrane-electrode assembly). Electrically conductive separator plates are disposed outside the MEA to mechanically fix the MEA and to electrically connect adjoining MEAs with one another in series. Gas flow channels, through which reaction gases are supplied to the electrodes and a generated gas and excess gases are flown out, are formed in specific parts of the separator plates that are in contact with the MEA. The gas flow channel may be provided independently of the separator plate, but the general arrangement forms grooves on the surface of each separator plate to define the gas flow channel.

Through holes are formed in the separator plate to supply the fuel gas or the oxidant gas to the gas flow channel in the separator plate. The inlet and the outlet of the gas flow channel communicate with these through holes. The supply of the reaction gas is distributed via the through hole to the respective grooves of the gas flow channel. The through hole formed to supply the reaction gas to the respective grooves of the gas flow channel is referred to as the manifold aperture.

The fuel cell produces heat during its operation. The fuel cell should thus be cooled down with cooling water, in order to maintain the cell in a favorable temperature condition. A cooling unit for the flow of cooling water is typically provided between adjoining separator plates at every 1 to 3 unit cells. In many cases, the cooling unit is a cooling water flow channel formed in the rear face of the separator plate. A stack of fuel cells of typical construction is obtained by successively laying 10 through 200 unit cells one upon another to a cell laminate, which includes the MEAs, the separator plates, and the cooling units, disposing end plates across the cell laminate via collector plates and insulator plates, and clamping the both end plates with clamping bolts.

For easiness of processing, in the polymer electrolyte fuel cell, the separator plate generally has a square or rectangle contour. An identical shape is applied to manifold apertures for a fuel gas containing hydrogen, manifold apertures for an oxidant gas containing oxygen, and manifold apertures for cooling water. This enables sealing members and other peripheral members to be shared. These manifold apertures are arranged to be practically symmetrical about the centerline and the diagonal of the separator plate.

When the contour of the separator plate is square or rectangle as in the case of the prior art polymer electrolyte fuel cells, the orientation of the separator plate can not be specified according to the contour in the course of assembling the cell stack. It is accordingly difficult to check the surface and the rear face of the separator plate. In the case where an identical shape is applied for the respective manifold apertures and the manifold apertures are arranged in a line symmetrical layout, the separator plate does not have any specific orientation of the surface and the rear face. For the CO poisoning resistance, different noble metal catalysts are generally used for the anode and the cathode in the MEA. The proper orientation of the surface and the rear face of the MEA is thus of significant importance. The MEA basically has the same contour and the same pattern of the manifold apertures as those of the separator plate. The MEA accordingly does not have any specific orientation of the surface and the rear face. There is accordingly a high possibility that the anode and the cathode are mistakenly set in the course of assembling the cell stack.

Each manifold aperture plays an important role of distributing the reaction gas or cooling water to the corresponding flow channels in the respective separator plates of the cell laminate. The ratio of the opening area of each manifold aperture to the total sectional area of each corresponding flow channel in the separator plates affects the flow rate of the fluid. The excessively small flow rate has a significant effect on the dynamic pressure and remarkably worsens the distribution to the respective separator plates. The prior art technique applies an identical shape to the respective manifold apertures, in order to maintain the symmetry of the separator plate. This technique, however, makes it difficult to attain the adequate ratio of the opening area of each manifold aperture to the total sectional area of each flow channel.

DISCLOSURE OF INVENTION

The present invention is directed to a polymer electrolyte fuel cell including a hydrogen ion-conductive polymer electrolyte membrane, an anode and a cathode sandwiching the hydrogen ion-conductive polymer electrolyte membrane, an anode-side conductive separator plate having a gas flow channel for supplying a fuel gas to the anode, and a cathode-side conductive separator plate having a gas flow channel for supplying an oxidant gas to the cathode, wherein each of the anode-side conductive separator plate and the cathode-side conductive separator plate is rectangle in shape and has fuel gas manifold apertures, oxidant gas manifold apertures, and cooling water manifold apertures, which are arranged in the following layout and have mutually different opening shapes.

An oxidant gas manifold aperture for an inlet is arranged on one short side of the rectangular separator plate, while an oxidant gas manifold aperture for an outlet is arranged on the other short side. A fuel gas manifold aperture for an inlet and a fuel gas manifold aperture for an outlet are arranged on different longitudinal sides, whereas a cooling water manifold aperture for an inlet and a cooling water manifold aperture for an outlet are arranged on the different longitudinal sides. The respective fuel gas manifold apertures are disposed opposite to the cooling water manifold apertures.

It is preferable that the fuel gas manifold apertures and the cooling water manifold apertures arranged in the each conductive separator plate are symmetrical about the center of the conductive separator plate, but are not symmetrical about any centerline passing through the center.

It is further preferable that a contour of the each conductive separator plate is symmetrical about the center of the conductive separator plate but is not symmetrical about any centerline passing through the center.

BRIEF DESCRIPTION OF THE DRAWINGS

FIG. 20 is a sectional view illustrating a main part of the fuel cell, taken on a line XX-XX' of FIG. 13.

FIG. 21 is a front view illustrating a separator plate used for a fuel cell of Embodiment 9 according to the present invention, seen from the cathode side.

FIG. 22 is a rear view of the separator plate.

FIG. 26 is a front view illustrating a separator plate included in the fuel cell, seen from the cathode side.

FIG. 27 is a sectional view showing a process of manufacturing a separator plate in Example 4.

FIG. 28 shows the output characteristics of fuel cells of Example 4 and a comparative example.

FIG. 29 is a sectional view showing a process of manufacturing a separator plate in Example 5.

FIG. 30 is a sectional view showing a process of manufacturing a separator plate in another embodiment.

FIG. 31 is a sectional view illustrating a main part of a separator plate in still another embodiment.

BEST MODES FOR CARRYING OUT THE INVENTION

Figure 1:
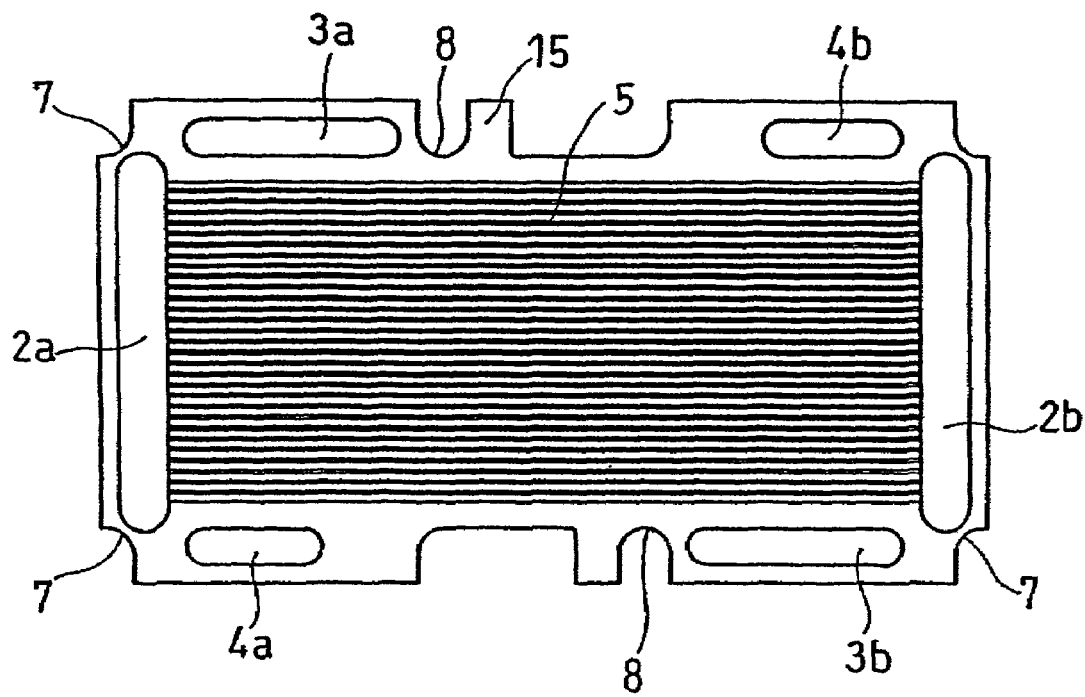
FIG. 1 is a front view illustrating a separator plate used for a fuel cell of Embodiment 1 according to the present invention, seen from a cathode side.

The present invention is characterized by the specified arrangement of the respective manifold apertures formed in the separator plate and by the mutually different opening shapes of the respective manifold apertures. This arrangement gives the orientation to the surface and the rear face of the separator plate and the MEA and thereby facilitates the check of the surface and the rear face in the course of assembling the cell stack. An appropriate value can be set to the ratio of the opening area of each manifold aperture for the oxidant gas, the fuel gas, or cooling water to the total sectional area of the corresponding fluid flow channel. This gives a high-performance polymer electrolyte fuel cell.

It is preferable that each opening area of the oxidant gas manifold apertures, the fuel gas manifold apertures, and the cooling water manifold apertures is 60 to 300% of a total sectional area of an oxidant gas flow channel, a fuel gas flow channel, or a cooling water flow channel in a whole stack of the fuel cells. With a view to reducing the thickness of the separator plate and lowering the manufacturing cost, the recently proposed technique for the polymer electrolyte fuel cell does not make holes in a site connecting the manifold apertures with the respective gas flow channels but uses gaskets disposed directly over the gas flow channels to ensure the required sealing property.

In the structure using the gaskets disposed directly over the gas flow channels for sealing, the heat applied to the gasket during operation of the cell and the clamping pressure cause the gasket material to be expanded and hang into the gas flow channel. This may undesirably lead to a clog of the gas flow channel or the occurrence of gas leakage.

In order to prevent such a hang of the gasket, one proposed technique forms grooves of the gas flow channel at smaller pitches in the separator plate and increases the depth of each groove. This technique, however, has limitation in reduction of the thickness of the separator plate and undesirably lowers the volume energy density and increases the material cost.

The present invention provides means to solve such problems. In the polymer electrolyte fuel cell of the present invention having the specified arrangement of the respective manifold apertures formed in the separator plate and the mutually different opening shapes of the respective manifold apertures, one preferable application of the sealing structure using gaskets disposed directly over the gas flow channels in the conductive separator plate forms a groove, which receives a hang of expansion of the gasket, in the separator plate with the gas flow channel. This application ensures the sufficient gas sealing property.

A stack of polymer electrolyte fuel cells of the preferable application is obtained by laying unit cells one upon another via single-layered or complex separator plates. Each unit cell includes a polymer electrolyte membrane and a pair of electrodes disposed across the electrolyte membrane. The separator plate has a fuel gas flow channel formed in one face that is in contact with one electrode, and an oxidant gas flow channel formed in another face that is in contact with the other electrode. A gasket is arranged on the outer circumference of each of the electrodes. Both the separator plate and the gasket respectively have a pair of manifold apertures for supplying and discharging a fuel gas and a pair of manifold apertures for supplying and discharging an oxidant gas. The separator plate has a groove formed outside a specific part of the gas flow channel communicating with the manifold aperture.

It is preferable that the groove formed outside the specific part of the gas flow channel does not connect the gas flow channel with the manifold aperture.

It is also preferable that the groove formed outside the specific part of the gas flow channel does not connect the gas manifold aperture for the inlet with the gas manifold aperture for the outlet.

It is further preferable that the groove has a length that is longer than a length of the specific part of the gas flow channel, which communicates with the manifold aperture and is in direct contact with the gasket, in a flow direction.

One technique of collecting performance data of each unit cell in a stack of fuel cells forms a specific hole in the side face of each separator plate and inserts a pin into the hole for collection of data. Another technique prepares a jig with a pin of an expandable structure inserted in a long bar of a rectangular prism and presses the pin of the jig against the separator plate on the side face of a fuel cell stack including the MEAs and the separator plates. In the former method, the pin is pressed into the separator plate and thus applies mechanical loading to the separator plate. This may lead to destruction of the separator plate or an increase in working cost of the separator plate. In the latter method, on the other hand, the press of the pin against the separator plate has a low reliability and may not directly measure the performance of the unit cell.

The present invention provides means to solve such problems. In accordance with one preferable application of the present invention, either of the cathode-side conductive separator plate and the anode-side conductive separator plate has a recess formed on a surface thereof to be open to outside, and a flat terminal for measurement of cell performance is attached to the recess. The flat terminal for measurement of cell performance attached to the recess in the separator plate is fixed by the clamping pressure of the fuel cell stack. This arrangement accordingly does not destroy the separator plate and assures the sufficient reliability in measurement of the performance.

It is preferable that the recess of the conductive separator plate, to which the terminal for measurement of cell performance is attached, is formed at different positions in adjoining unit cells.

It is also preferable that the recess of the conductive separator plate, to which the terminal for measurement of cell performance is attached, is formed in different orientations in adjoining unit cells.

It is further preferable that the recess formed in the separator plate is symmetrical about the center of the separator plate.

In accordance with one preferable application of the present invention, the recess has a hole in a deepest portion thereof, and the terminal for measurement of cell performance has an L-shaped curved end, which is fitted in the hole.

In accordance with another preferable application of the present invention, the terminal for measurement of cell performance has a folded tip on the curved end, and the folded tip is received in a recess formed in a rear face of the conductive separator plate.

Either of the anode-side conductive separator plate and the cathode-side conductive separator plate may be a single-layered separator plate.

In the polymer electrolyte fuel cell, the separator plate is required to have the high electric conductivity, the high gas tightness against the fuel gas and the oxidant gas, and the high corrosion resistance against the reactions of oxidizing and reducing hydrogen/oxygen. In order to satisfy such requirements, the separator plate is generally composed of a carbon material, such as glassy carbon or expanded graphite. The gas flow channel is formed by cutting the surface of the carbon material or by molding with a die in the case of expanded graphite. Such separator plates, however, have the high cutting and material costs, and application of a metal like stainless steel to the separator plate has been examined.

In the course of operation of the polymer electrolyte fuel cell, the fuel gas and the oxidant gas are humidified for the enhanced electric conductivity of the hydrogen ion-conductive polymer electrolyte. Bedewed water from these gases or water produced through the chemical reactions inside the cell may interfere with the smooth gas flow through the gas flow channel. This leads to an inefficient supply of the gas and may, in the worst case, stop the operation of the fuel cells. One proposed technique processes the gas flow channel to make hydrophilic. The low adhesion of a hydrophilicity processing agent against the separator plate, however, causes a time-based change of the hydrophilicity processing ability.

The present invention provides means to solve such problems and enable application of a metal material for the separator plate. The technique roughens the surface to have concaves and convexes on at least part of the oxidant gas flow channel in the cathode-side conductive separator plate and/or the fuel gas flow channel in the anode-side conductive separator plate.

It is preferable that a metal oxide layer formed on at least part of a surface of the gas flow channel.

It is also preferable that the metal oxide layer has a ratio of a metal element continuously varying in a direction of thickness from a side in contact with the metal plate to a surface of the metal oxide layer.

It is further preferable that the metal element included in the metal oxide layer is identical with a metal element that is a primary constituent of the metal plate.

In the stack of fuel cells including the metal separator plates, a preferable driving method feeds a supply of the oxidant gas to the anode and the cathode under a non-loading condition at every predetermined driving time.

The metal plate may be applied to only one of the anode-side separator plate and the cathode-side separator plate. The separator plate is manufactured by pressing a metal plate to form ribs or grooves functioning as the gas flow channel. Any of stainless steel, aluminum, and titanium that have excellent electric conductivity and are readily pressed to have the ribs or grooves functioning as the gas flow channel is applicable for the metal base plate. A metal oxide film is formed on the surface of the gas flow channel in the metal plate. The metal oxide film includes a metal selected among Al, Ti, Cr, Zr, Ta, V, Nb, La, and W. The rf sputtering technique may be used to form the metal oxide layer, although the chemical deposition and plating techniques are also applicable. A concrete procedure applies the sputtering technique in an oxygen-containing atmosphere with a metal as the target or the sputtering technique with a metal oxide as the target.

In the case where the metal element of the metal oxide layer is identical with the metal element of the metal separator plate, the metal plate is subjected to heat treatment in an oxidizing atmosphere at 250 to 400° C. for 5 minutes through 2 hours to form the metal oxide film. The content of the metal element in the metal oxide film is varied to increase from the surface of the metal oxide film to the separator plate. This arrangement enhances the adhesion of the metal oxide film against the separator plate, relieves the remaining stress in the metal oxide film, and prevents the occurrence of pin holes.

The method applicable to regulate the content of the metal atom in the metal oxide layer is controlling the flow rate of gaseous oxygen in the sputtering gas or controlling the rf power in the process of sputtering the metal in an oxygen-containing atmosphere to form the metal oxide film. In the case of the organic metal CVD method to form the metal oxide film, the method of controlling the reaction gas is applicable.

The sand blasting and (chemical) etching techniques may be used to roughen the surface of the gas flow channel in the metal plate or the surface of the metal oxide layer formed in the gas flow channel. Another technique like dry etching is also applicable.

Some embodiments of the present invention are discussed below with reference to the drawings.

EMBODIMENT 1

The structure of a separator plate included in a polymer electrolyte fuel cell of one embodiment is illustrated in FIG. 1. FIG. 1 is a front view showing a separator plate seen from a cathode side.

This separator plate 1 is, for example, a machined rectangular glassy carbon plate, and has a pair of manifold apertures 2a and 2b for an oxidant gas arranged on short sides thereof, as well as a pair of manifold apertures 3a and 3b for cooling water and a pair of manifold apertures 4a and 4b for a fuel gas arranged on longitudinal sides thereof. The manifold apertures 2a, 3a, 4a are formed at different sides. The manifold apertures 2b, 3b, and 4b are also formed at different sides. The cooling water manifold apertures 3a and 3b are respectively arranged opposite to the fuel gas manifold apertures 4a and 4b. One manifold aperture in each pair is an inlet, and the other is an outlet. For example, the manifold apertures 2a, 3a, and 4b are inlets, whereas the manifold apertures 2b, 3b, and 4a are outlets.

In the embodiment of FIG. 1, a plurality of straight grooves are formed as a gas flow channel 5 to connect the oxidant gas manifold apertures 2a and 2b with each other.

The separator plate 1 has a contour discussed below. Notches 7 are formed at four corners of the separator plate 1 to receive fixation bolts therein for clamping of a cell laminate. Notches 8 are also formed in a neighborhood of the manifold apertures 3a and 3b to receive fixation bolts in the cell laminate.

The three types of manifold apertures, that is, the oxidant gas manifold aperture, the cooling water manifold aperture, and the fuel gas manifold aperture, have opening areas decreasing in this order. Namely the three types of manifold apertures have different shapes. The cooling water manifold apertures, the fuel gas manifold apertures, and the notches 8 are arranged at positions to be symmetrical about the center of the separator plate 1 but not to be symmetrical about any centerline passing through the center of the separator plate. The oxidant gas manifold apertures and the notches 7 are arranged to be symmetrical about the center of the separator plate and about a centerline.

The separator plate of such construction has the proper orientation of the surface and the rear face and includes the notches 7 and 8, which receive the fixation bolts therein. This arrangement thus completely prevents the separator plates from being laid one upon another in a reverse direction in the process of assembling a fuel cell stack.

EMBODIMENT 2

Figure 2:
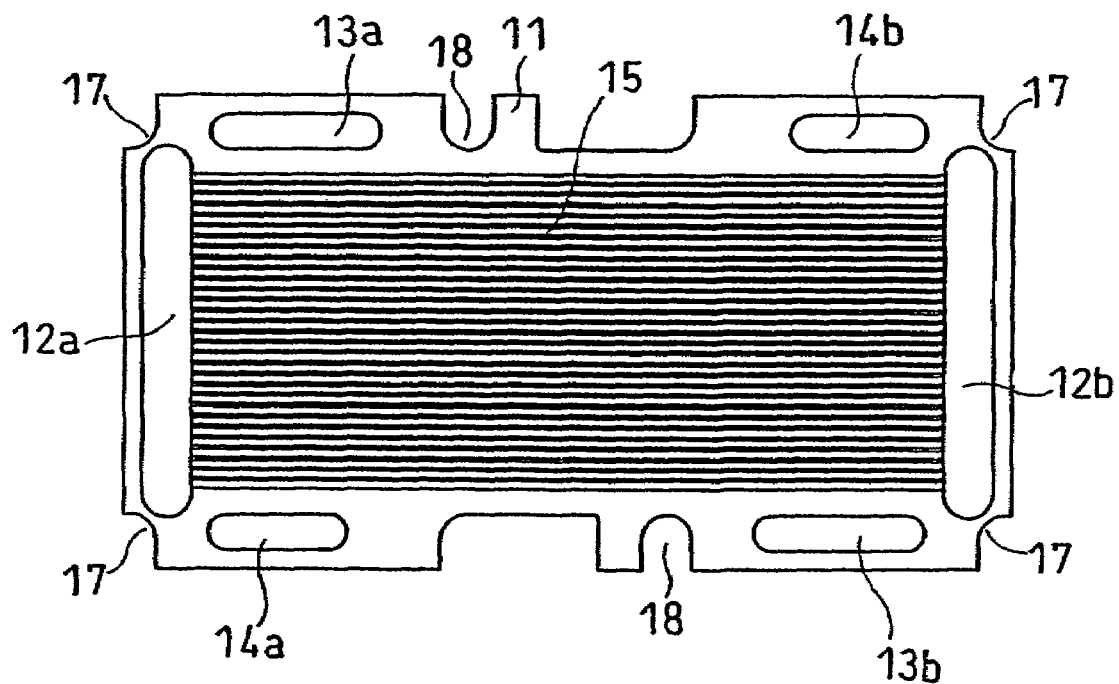
FIG. 2 is a front view illustrating a separator plate used for a fuel cell of Embodiment 2 according to the present invention, seen from the cathode side.

The structure of a separator plate included in a polymer electrolyte fuel cell of another embodiment is illustrated in FIG. 2.

FIG. 2 is a front view showing a separator plate seen from the cathode side.

This separator plate 11 is, for example, a machined rectangular glassy carbon plate, and has a pair of manifold apertures 12a and 12b for the oxidant gas arranged on short sides thereof, as well as a pair of manifold apertures 13a and 13b for cooling water and a pair of manifold apertures 14a and 14b for the fuel gas arranged on longitudinal sides thereof. The manifold apertures 12a, 13a, 14a are formed at different sides. The manifold apertures 12b, 13b, and 14b are also formed at different sides. The cooling water manifold apertures 13a and 13b are respectively arranged opposite to the fuel gas manifold apertures 14a and 14b. Like Embodiment 1, the opening areas of the three types of manifold apertures, the oxidant gas manifold aperture, the cooling water manifold aperture, and the fuel gas manifold aperture, decrease in this order.

In the embodiment of FIG. 2, a plurality of straight grooves are formed as a gas flow channel 15 to connect the oxidant gas manifold apertures 12a and 12b with each other.

Notches 17 and 18, which receive fixation bolts therein, are formed at four corners and in a neighborhood of the manifold apertures 13a and 13b in the separator plate 11.

Like Embodiment 1, this separator plate has a point symmetrical structure, while the cooling water manifold apertures, the fuel gas manifold apertures, and the notches 18 are not symmetrical about any centerline passing through the center of the separator plate. The separator plate of such construction has the proper orientation of the surface and the rear face and includes the notches, which receive the fixation bolts therein. This arrangement thus completely prevents the separator plates from being laid one upon another in a reverse direction in the process of assembling the stack of fuel cells.

Figure 3:
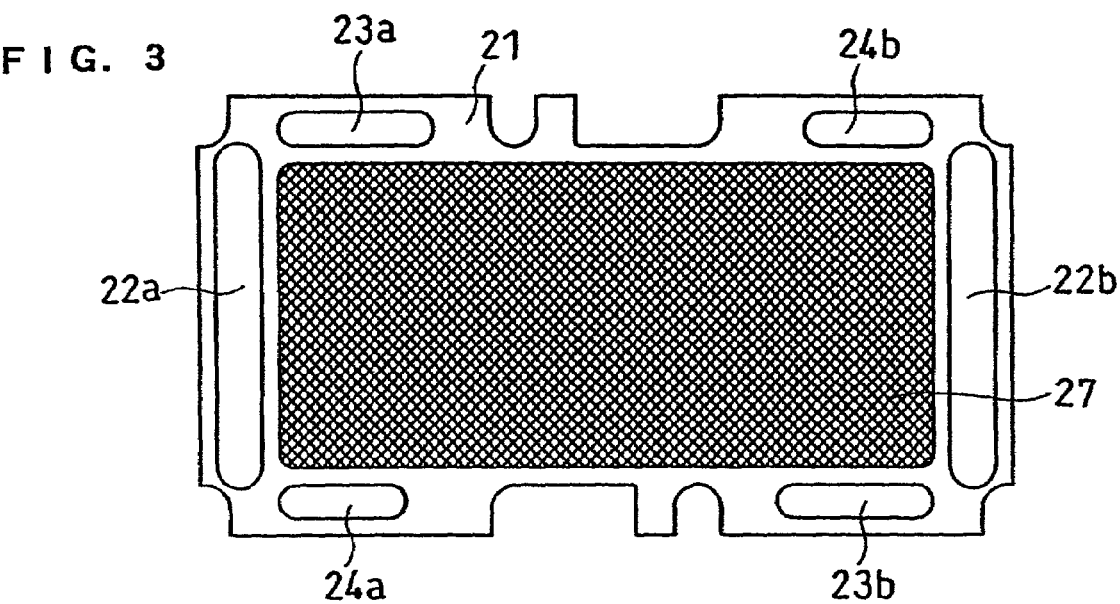
FIG. 3 is a front view illustrating an MEA used for the fuel cell of Embodiment 2, seen from an anode side.

FIG. 3 is a front view illustrating an MEA in a fuel cell, seen from the anode side. The center of the MEA is an anode-side gas diffusion layer 27 composed of carbon paper, and a gasket 21 having the identical shape with that of the separator plate 11 is joined with the outer circumference of the anode-side gas diffusion layer 27 by hot pressing. A pair of manifold apertures 22a and 22b for the oxidant gas are formed on short sides of the quasi-rectangular MEA, whereas a pair of manifold apertures 23a and 23b for cooling water and a pair of manifold apertures 24a and 24b for the fuel gas are formed on longitudinal sides of the MEA. The three types of manifold apertures and notches, which receive fixation bolts therein, have identical shapes and sizes with those formed in the separator plate 11.

An anode-side catalyst layer, a polymer electrolyte membrane, a cathode-side catalyst layer, and a cathode-side gas diffusion layer are provided on the rear face of the anode-side gas diffusion layer 27 in the MEA shown in FIG. 3.

Adjusting the shape of the gasket to the shape of the separator plate explicitly determines the proper orientation of the surface and the rear face of the MEA. This arrangement thus readily prevents the MEAs from being laid one upon another in a reverse direction in the process of assembling the fuel cell stack.

EMBODIMENT 3

Figure 4:
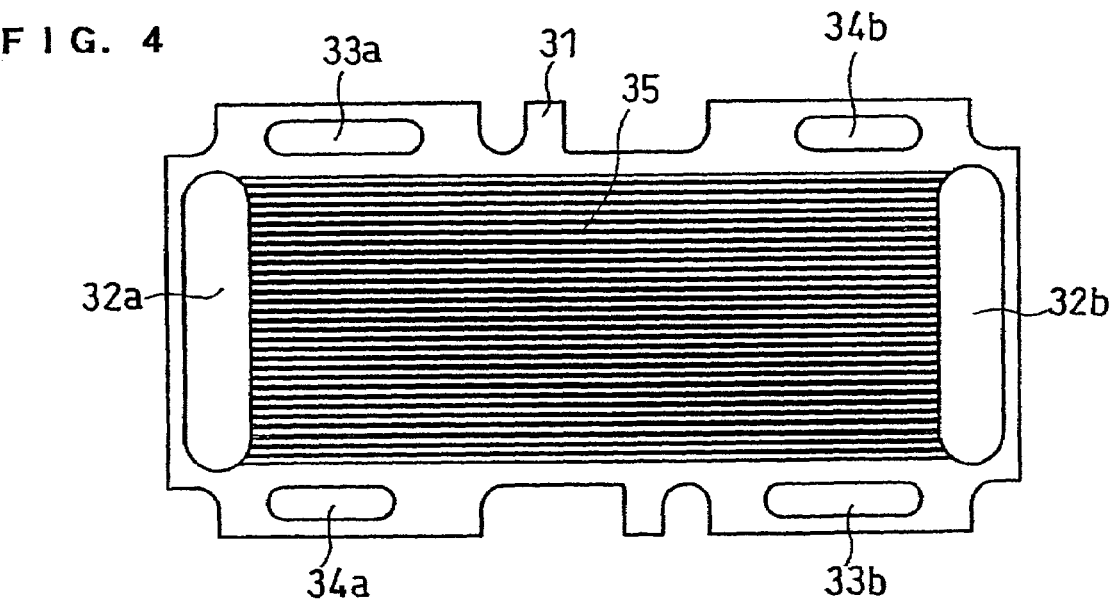
FIG. 4 is a front view illustrating a separator plate used for a fuel cell of Embodiment 3 according to the present invention, seen from the cathode side.

FIG. 4 is a front view illustrating a separator plate in still another embodiment seen from the cathode side.

This separator plate 31 has a pair of manifold apertures 32a and 32b for the oxidant gas arranged on short sides thereof, as well as a pair of manifold apertures 33a and 33b for cooling water and a pair of manifold apertures 34a and 34b for the fuel gas arranged on longitudinal sides thereof. The manifold apertures 32a, 33a, 34a are formed at different sides. The manifold apertures 32b, 33b, and 34b are also formed at different sides. The cooling water manifold apertures 33a and 33b are respectively arranged opposite to the fuel gas manifold apertures 34a and 34b. Like Embodiment 1, the opening areas of the three types of manifold apertures, the oxidant gas manifold aperture, the cooling water manifold aperture, and the fuel gas manifold aperture, decrease in this order. A plurality of straight grooves are formed as a gas flow channel 35 to connect the oxidant gas manifold apertures 32a and 32b with each other.

Like the embodiments discussed above, this separator plate 31 has the proper orientation of the surface and the rear face and includes the notches, which receive the fixation bolts therein. This arrangement thus completely prevents the separator plates from being laid one upon another in a reverse direction in the process of assembling the fuel cell stack.

It is here preferable that the opening area of each of the oxidant gas manifold apertures 32a and 32b is not less than 60% but not greater than 300% of the sum of sectional areas of the fluid (in this case, the oxidant gas) flow channels 35 (that is, cross section of each groove×number of grooves) which are formed in the separator plates of respective unit cells, in a cell laminate (hereinafter referred to as the total sectional area of each fluid flow channel). Although not being specifically shown, it is also preferable that the respective opening areas of the fuel gas manifold apertures 34a and 34b and the cooling water manifold apertures 33a and 33b are not less than 60% but not greater than 300% of the total sectional areas of the fuel gas flow channel and the cooling water flow channel. The opening area of the manifold aperture that is less than 60% of the total sectional area of the fluid flow channel causes a delayed recovery of the static pressure in the vicinity of the fluid inlet in the cell laminate. This leads to an insufficient gas distribution and does not attain desired cell performances. The opening area of greater than 300%, on the other hand, causes the water content in the gas to be bedewed by heat dissipation and lowers the cell voltage. The large opening areas of the manifold apertures undesirably increase the size of the separator plate, thus enlarging the size of a resulting stack of fuel cells and raising the manufacturing cost.

EXAMPLE 1

50% by weight of platinum particles having a mean particle diameter of approximately 30 angstrom were carried on conductive carbon particles KETJEN BLACK EC (manufactured by AKZO Chemie, the Netherlands) having a mean primary particle diameter of 30 nm. This was used as a catalyst for a cathode. 25% by weight of platinum particles having the mean particle diameter of approximately 30 angstrom and 25% by weight of ruthenium particles having the same mean particle diameter were carried on KETJEN BLACK EC. This was used as a catalyst for an anode. Isopropyl alcohol dispersions of the respective catalyst particles were respectively mixed with an ethyl alcohol dispersion of perfluorocarbon sulfonic acid to yield pastes for catalyst layers of the cathode and the anode. A catalyst layer of each paste was formed on one plane of carbon non-woven fabric having a thickness of 250 μm by screen printing. This procedure gave the cathode with the catalyst layer containing platinum and the anode with the catalyst layer containing platinum and ruthenium. The quantity of the catalyst metal included in each electrode was adjusted to 0.5 mg/cm$^2$, and the quantity of perfluorocarbon sulfonic acid to 1.2 mg/cm$^2$.

The anode and the cathode were joined with either face of the center portion of a hydrogen ion-conductive polymer electrolyte membrane having a little greater area than those of the electrodes by hot pressing, such that the printed catalyst layers are in contact with the electrolyte membrane. A thin film of perfluorocarbon sulfonic acid (Nafion 112 manufactured by E.I. Du Pont de Nemours & Co. Inc, the USA) was used for the hydrogen ion-conductive polymer electrolyte membrane. Gaskets, which were punched out to have the identical contour with that of the separator plate, were joined with the outer circumferences of the two electrodes across the electrolyte membrane by hot pressing. This completed an electrolyte membrane-electrode assembly (MEA).

Figure 5:
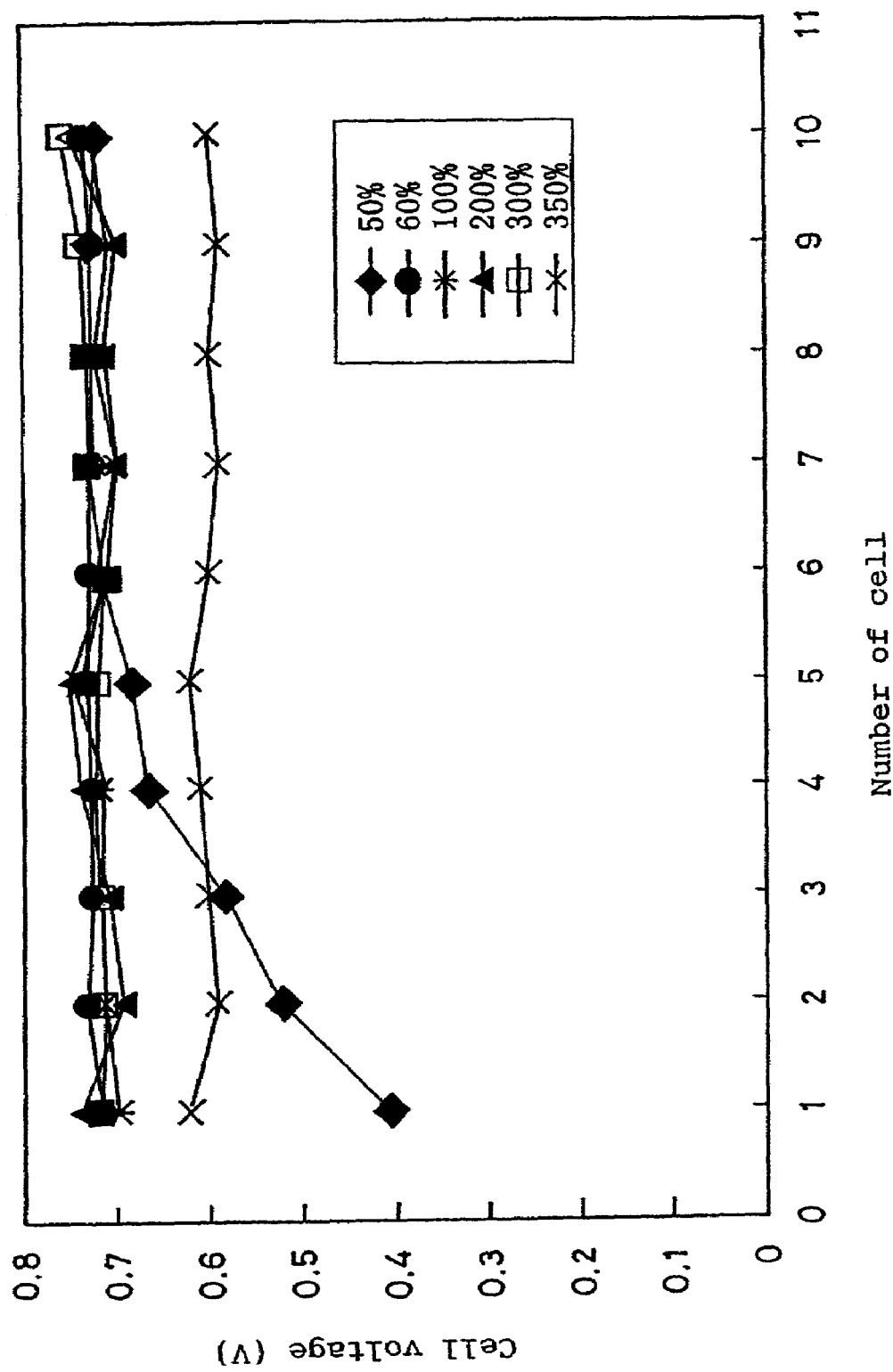
FIG. 5 shows voltages of respective cells in fuel cells of Example 1 of the present invention and a comparative example.
Figure 15:
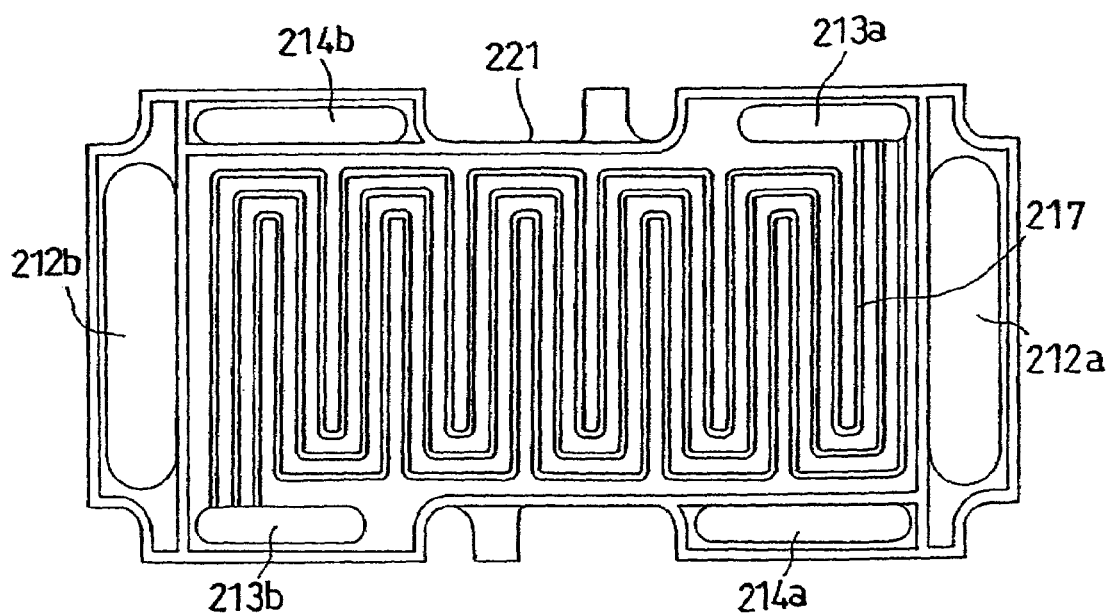
FIG. 15 is a rear view of the separator plate.
Figure 16:
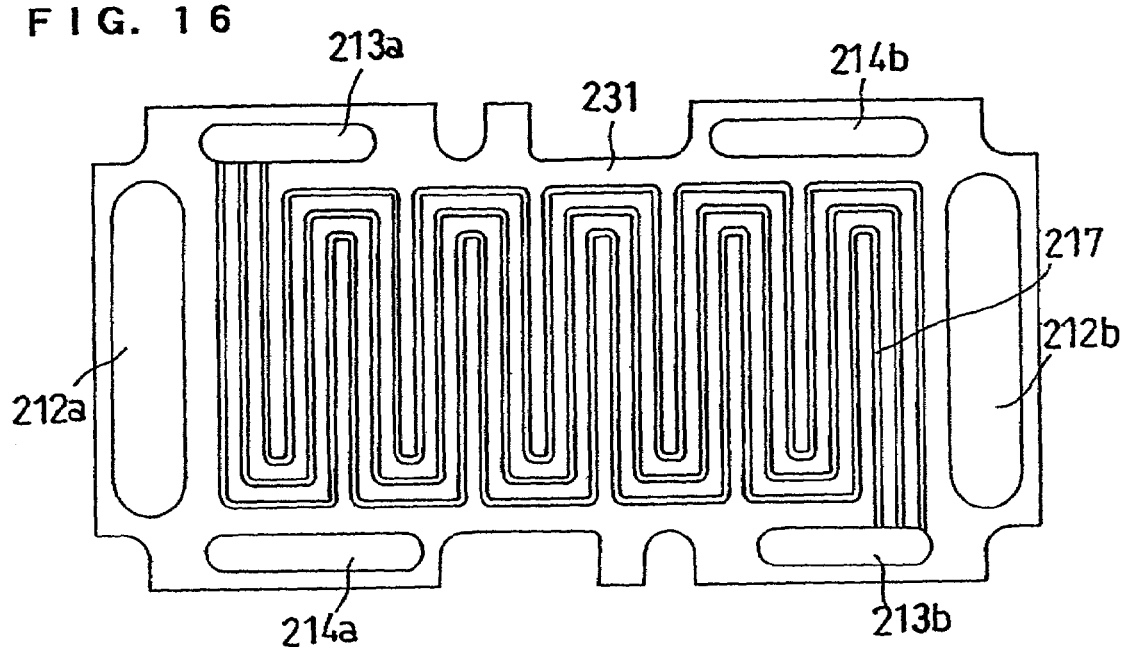
FIG. 16 is a front view illustrating still another separator plate used for the fuel cell.

A cell laminate was obtained by laying 100 MEAs one upon another via the separator plates. The separator plates according to Embodiment 3 discussed above were used here. The separator plate on the cathode side had a fuel gas flow channel of Embodiment 8 shown in FIG. 13. A complex separator plate of Embodiment 8 with a cooling module on the rear face thereof, which was prepared by combining a cathode-side separator plate and an anode-side separator plate having cooling water flow channels as shown in FIGS. 15 and 16 with each other, was inserted at every two unit cells. Multiple cell laminates were produced by varying the ratio of each manifold aperture to the total sectional area of each fluid flow channel. FIG. 5 shows a distribution of the voltage in the respective unit cells under the driving conditions. The opening areas of the three types of manifold apertures to the total sectional areas of the respective fluid flow channels are set to a fixed value in the same cell laminate.

A model reformed gas (hydrogen: 80% by volume, carbon dioxide: 20% by volume, and carbon monoxide: 50 ppm) was used for the fuel gas, and the air was used for the oxidant gas. The cell performances were tested under the following conditions: the cell temperature at 75° C., the hydrogen utilization rate of 80%, the oxygen utilization rate of 50%, the humidifying bubbler temperature of the fuel gas at 75° C., the humidifying bubbler temperature of the air at 50° C., and the current density of 0.3 A/cm$^2$. The results of the test are plotted in FIG. 5, with the cell number from the gas inlet as abscissa and the cell voltage as ordinate. The values of only the 10 cells from the gas inlet are shown here.

As clearly shown in FIG. 5, the cell Nos. 1 through 4 had significant voltage drops, since recovery of the static pressure in the vicinity of the gas inlet was delayed to cause an insufficient gas distribution in the cell laminate having the opening area ratio of the manifold aperture that was less than 60%. The opening area ratio of the manifold aperture that exceeded 60% improved the gas distribution, and no significant voltage drop arose even in the cell on the end. The opening area ratio of greater than 300% increased the area of the manifold apertures in the separator plate and caused bedewing of the water content in the gas, thus undesirably lowering the cell voltage. The preferable ratio of the opening area of each manifold aperture to the total sectional area of each fluid flow channel is accordingly 60 to 300%.

EMBODIMENT 4

In this and subsequent embodiments, the separator plate and the gasket have notches formed at four corners and in a neighborhood of cooling water manifold apertures for receiving fixation bolts therein, like the embodiments discussed above, although not specifically mentioned.

Figure 6:
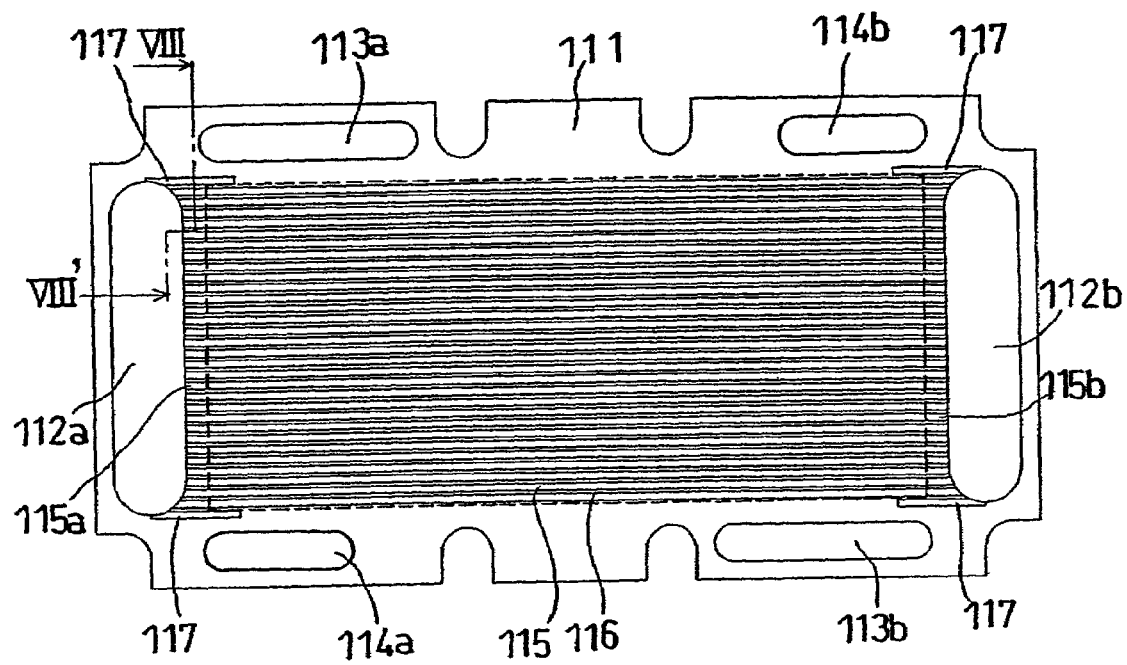
FIG. 6 is a front view illustrating a separator plate used for a fuel cell of Embodiment 4 according to the present invention, seen from the cathode side.
Figure 7:
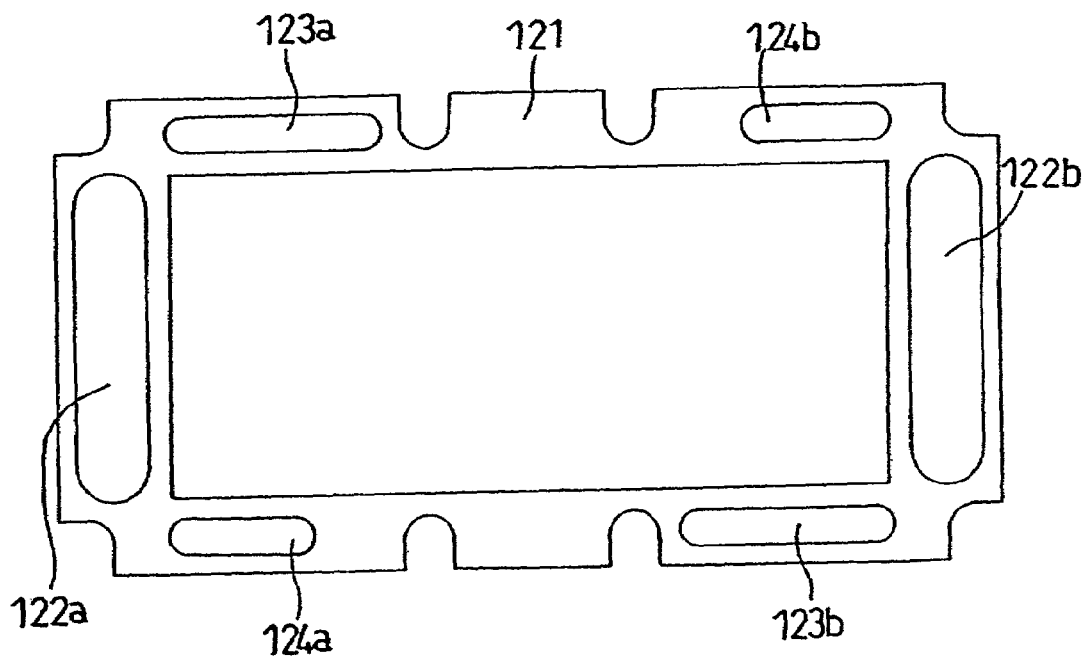
FIG. 7 is a front view illustrating a gasket used for the fuel cell of Embodiment 4.

A separator plate and a gasket in this embodiment are illustrated in FIG. 6 and FIG. 7, respectively.

A separator plate 111 has a gas flow channel and manifold apertures formed by machining a glassy carbon plate having a thickness of 3 mm. A plurality of parallel grooves having a width of approximately 2 mm and a depth of approximately 1 mm are formed as a gas flow channel 115 on a specific plane of the separator plate 111 facing a cathode. A rib 116 between the adjoining grooves of the gas flow channel has a width of approximately 1 mm.

A pair of manifold apertures 112a and 112b for the oxidant gas, a pair of manifold apertures 114a and 114b for the fuel gas, and a pair of manifold apertures 113a and 113b for cooling water are provided on the circumference of the separator plate 111. One manifold aperture in each pair defines a supply port, while the other defines an exhaust port.

The manifold aperture 112a out of the pair of oxidant gas manifold apertures forms the supply port. In the course of the flow from the manifold aperture 112a through the gas flow channel 115 to the manifold aperture 112b, oxygen included in the supply of the air is diffused to the catalyst layer on the cathode and subjected to an electrode reaction, and the remaining gas carries away water and other side products of the electrode reaction. The specific part of the separator plate 111 that is in contact with the electrode is shown by the dotted line in FIG. 6.

Figure 13:
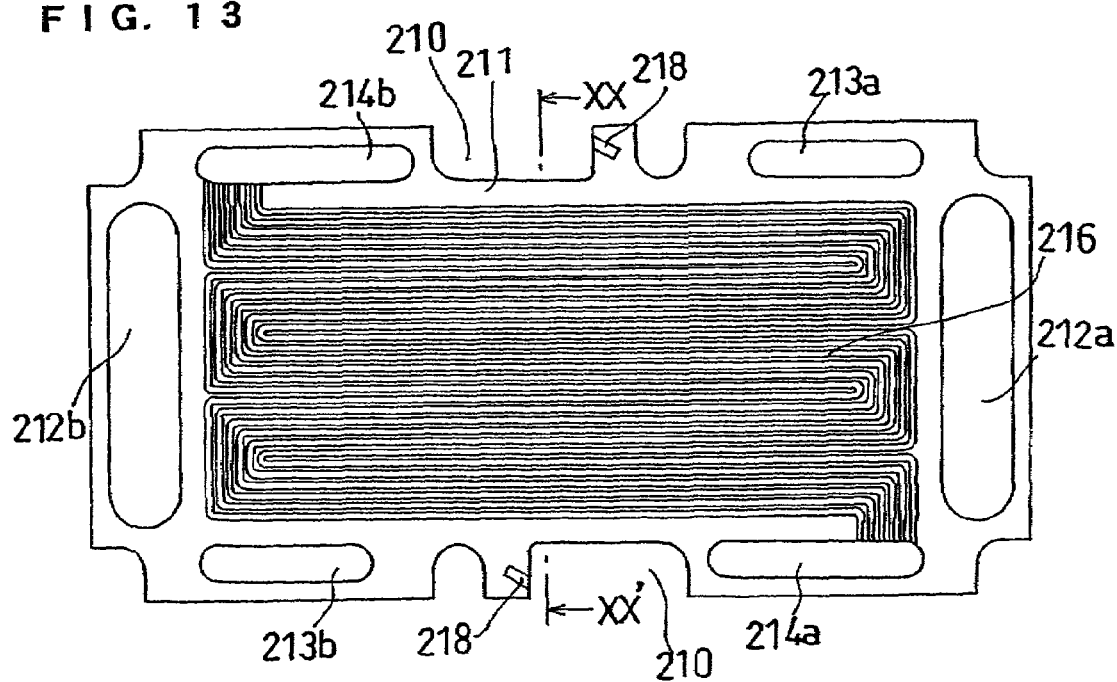
FIG. 13 is a rear view of the separator plate.

A gas flow channel for leading the fuel gas from the fuel gas supply manifold aperture 114b to the exhaust manifold aperture 114a is formed in a serpentine layout, like illustration of FIG. 13, on the rear face of the separator plate 111.

A laminate of fuel cells includes complex separator plates of the following specific construction for the flow of cooling water, as well as the conductive single-layered separator plates 111 having the oxidant gas flow channel on one face and the fuel gas flow channel on the other face. The complex separator plate includes a separator plate having an oxidant gas flow channel on one face and a cooling water flow channel on the other face and a separator plate having a cooling water flow channel on one face and a fuel gas flow channel on the other face. These two separator plates are joined with each other to give the complex separator plate, such that the planes with the cooling water flow channels are in contact with each other. The complex separator plate is interposed between the adjoining MEAs.

A gasket 121 is produced by die cutting a butyl rubber sheet having a thickness of 250 µm, and has a pair of oxidant gas manifold apertures 122a and 122b, a pair of fuel gas manifold apertures 124a and 124b, and a pair of cooling water manifold apertures 123a and 123b, which respectively communicate with the corresponding manifold apertures formed in the separator plate 111.

Figure 8:
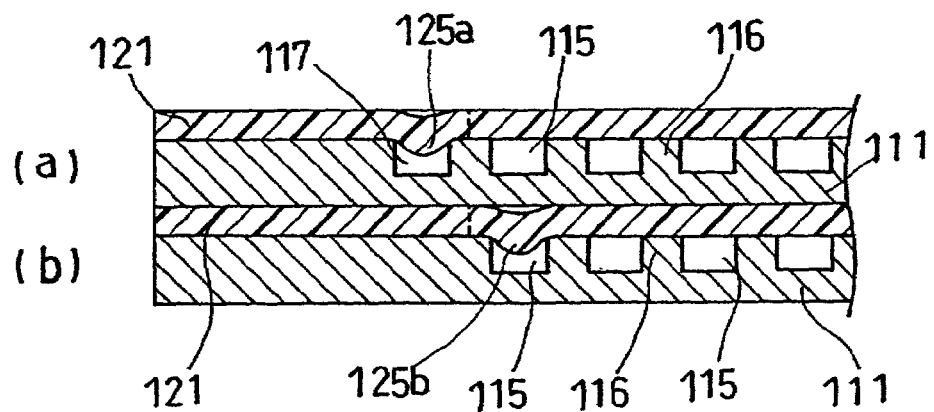
FIG. 8 is a sectional view illustrating a main part of the fuel cell, taken on a line VIII-VIII' of FIG. 6.

FIG. 8 is a sectional view showing the MEA and the conductive separator plate having the gas flow channel for the oxidant gas on one face to which the MEA is joined, taken on the line VIII-VIII' of FIG. 6.

FIG. 8(a) shows the structure including the separator plate 111 according to the present invention, and FIG. 8(b) shows the structure including a prior art separator plate 111'.

The separator plate 111 is provided with grooves 117 outside specific parts 115a and 115b, which communicate with the manifold apertures 112a and 112b at ends of the gas flow channel 115 and are in contact with the gasket 121. One end of each groove 117 is linked with either the manifold aperture 112a or the manifold aperture 112b, while the other end is closed. The flow of the gas accordingly does not pass through the grooves 117.

The separator plate 111' does not have the grooves 117. The gasket 121 is expanded by the clamping pressure of the cell laminate and the heat during the operation of the fuel cells and hangs into the outer-most groove of the gas flow channel 115a as shown by 125b in FIG. 8(b).

The separator plate 111 of this embodiment, on the other hand, has the grooves 117 outside the gas flow channel 115a. The expanded gasket 121 accordingly hangs into the groove 117 located on the outer-most side as shown by 125a in FIG. 8(a). This arrangement effectively prevents the gasket from hanging into the gas flow channel 115a.

In the separator plate and the gasket, the opening area of the fuel gas manifold apertures is smaller than the opening area of the cooling water manifold apertures. The contours and the manifold apertures of the separator plate and the gasket are accordingly point symmetrical about the respective centers, but are not symmetrical about any centerline passing through the center. The grooves 117 are both point symmetrical and line symmetrical.

EMBODIMENT 5

Figure 9:
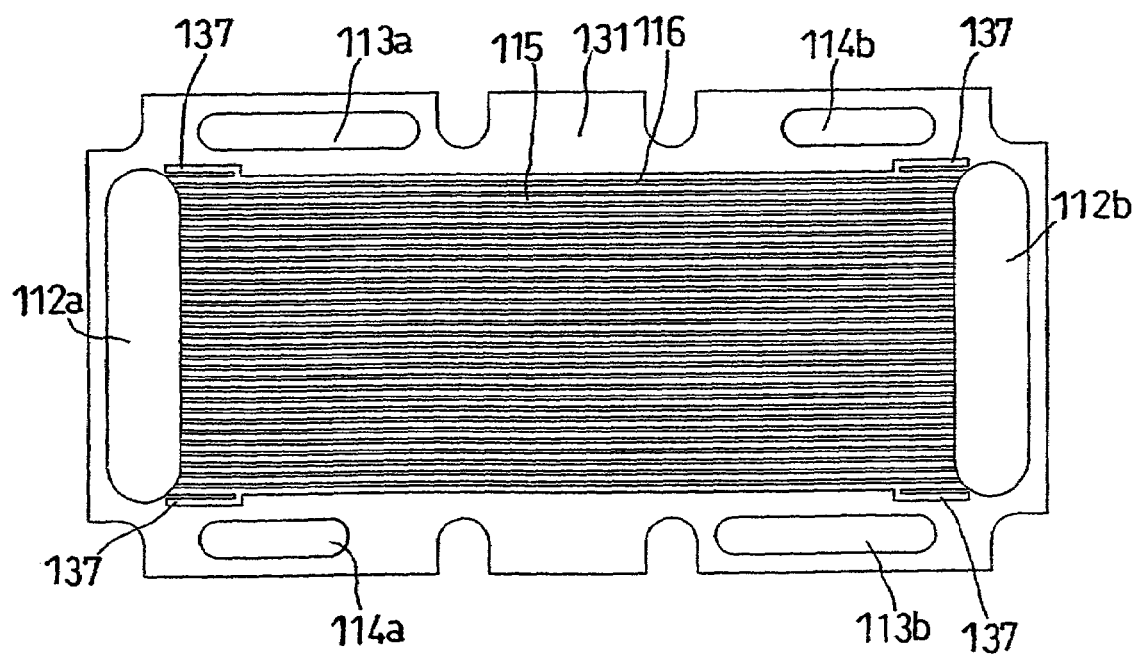
FIG. 9 is a front view illustrating a separator plate in Embodiment 5 of the present invention, seen from the cathode side.

A separator plate 131 in this embodiment is illustrated in FIG. 9. Grooves connecting with the outer-most grooves of the gas flow channel 115 define grooves 137 for absorbing the hang of the gasket. The end of the groove 137 close to the manifold aperture 112a or 112b is closed, so that the flow of the gas does not pass through the grooves 137.

EMBODIMENT 6

Figure 10:
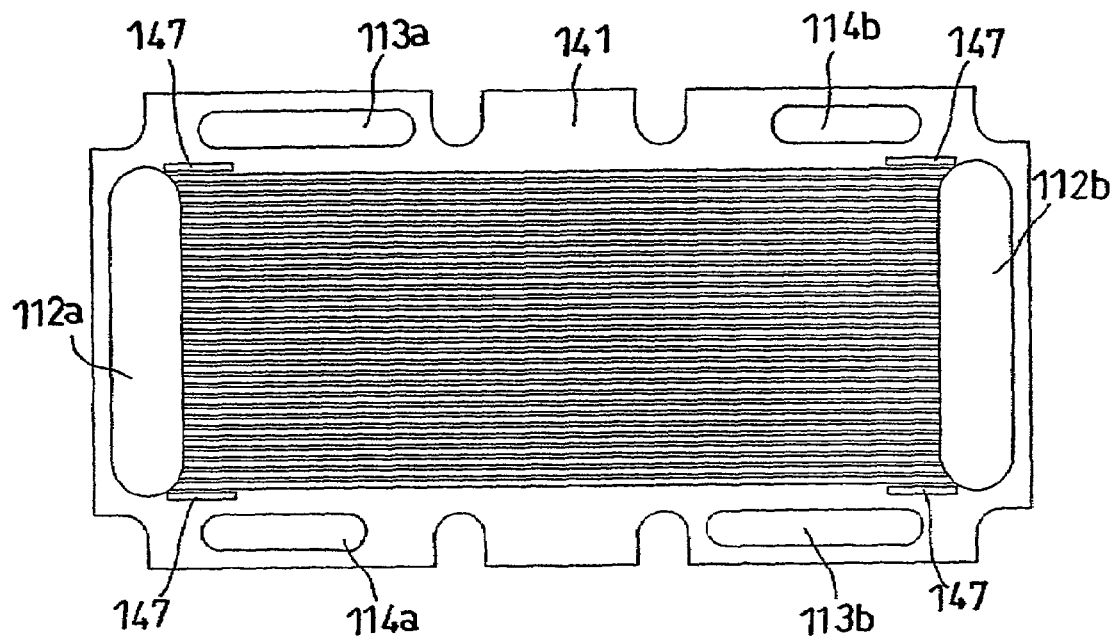
FIG. 10 is a front view illustrating a separator plate in Embodiment 6 of the present invention, seen from the cathode side.

A separator plate 141 in this embodiment is illustrated in FIG. 10. Grooves 147 for absorbing the hang of the gasket are formed outside the gas flow channel 115, independently of the gas flow channel 115 and the manifold apertures 112a and 112b.

EMBODIMENT 7

Figure 11:
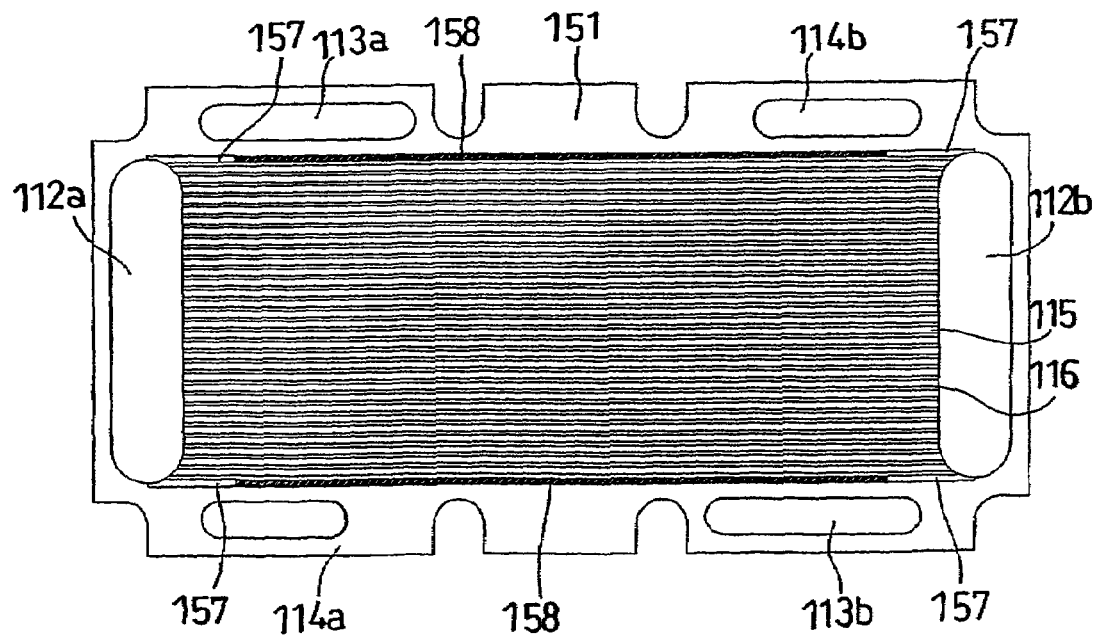
FIG. 11 is a front view illustrating a separator plate in Embodiment 7 of the present invention, seen from the cathode side.

A separator plate 151 in this embodiment is illustrated in FIG. 11. Grooves 157 for absorbing the hang of the gasket are formed by sealing grooves, which connect the manifold aperture 112a with the manifold aperture 112b, except both ends with a sealing agent 158. A resin adhesive like a silicone adhesive or asphalt is applicable for the sealing agent.

In the above embodiments, the grooves for absorbing the hang of the gasket are formed in the specific plane of the separator plate facing the cathode. Grooves for absorbing the hang of the gasket are also formed outside specific parts connecting with the fuel gas manifold apertures 114a and 114b in the separator plate 111. These grooves effectively prevent the gasket from hanging into the gas flow channel on the anode side.

EXAMPLE 2

A catalyst powder for electrode reaction was prepared by carrying platinum particles having a mean particle diameter of approximately 30 angstrom on acetylene black powder at the weight ratio of 2 to 1. The resulting catalyst powder was dispersed in isopropyl alcohol. An ethyl alcohol dispersion of perfluorocarbon sulfonic acid powder expressed by Formula (1) given below, where x=1, y=2, m=5 through 13, and n≈1000, was mixed with the isopropyl alcohol dispersion to obtain a paste. The paste was printed on one plane of carbon non-woven fabric having a thickness of 250 μm by screen printing to form a catalyst layer. The quantity of platinum included in the catalyst layer was 0.5 mg/cm², and the quantity of perfluorocarbon sulfonic acid was 1.2 mg/cm².

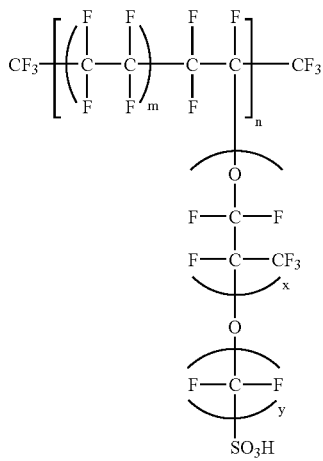

The electrode thus obtained was used for both the anode and the cathode. These electrodes were joined with either face of the center portion of a hydrogen ion-conductive polymer electrolyte membrane having a little greater size than those of the electrodes by hot pressing, such that the printed catalyst layers are in contact with the electrolyte membrane. Gaskets, which were punched out of a butyl rubber sheet of 250 μm in thickness to a size fitting the outer circumference of each electrode, were joined with the electrodes across the electrolyte membrane by hot pressing. This completed an electrolyte membrane-electrode assembly (MEA). A thin film of the perfluorocarbon sulfonic acid having a thickness of 25 μm was used for the hydrogen ion-conductive polymer electrolyte membrane.

A cell laminate was obtained by laying 50 MEAs one upon another via the conductive separator plates. The conductive separator plates used here were the separator plate 111 according to Embodiment 4 and the complex separator plate with the cooling unit for the flow of cooling water inserted at every two unit cells. A stack of fuel cells in Example 2 was completed by arranging a pair of stainless steel end plates across the cell laminate via collector plates and insulator plates and clamping the two end plates with fixation rods under a pressure of 2.0 MPa. The excessively small clamping pressure causes leakage of the gas and increases the contact resistance, thus undesirably lowering the cell performances. The excessively large clamping pressure, on the other hand, may damage the electrodes or deform the separator plates. It is accordingly important to adequately setting the clamping pressure according to the design of the gas flow channel.

A stack of fuel cells having the same construction as that of Example 2 without the grooves 117 outside the gas flow channel was manufactured as a fuel cell stack of a comparative example.

The polymer electrolyte fuel cells of Example 2 and the comparative example were kept at 85° C. A supply of gaseous hydrogen humidified and heated to have a dew point of 83° C. was fed to one electrode, while a supply of the air humidified and heated to have a dew point of 78° C. was fed to the other electrode. Under the non-loading condition with no output of the electric current, the fuel cell stack of Example 2 showed an open voltage of 50 V, whereas the fuel cell stack of the comparative example had an open voltage of 40 V. When the fuel cell stack of the comparative example was decomposed, there was a hang of the gasket at a position over the gas flow channel of the MEA. This caused cross leakage of hydrogen and the air. In the fuel cell stack of Example 2, on the other hand, the gasket hung in the grooves outside the gas flow channel. There was no hang of the gasket in the gas flow channel that requires sealing. This ensured the sufficient sealing property.

The grooves formed outside the gas flow channel in the separator plate absorb the expansion of the gasket material and thus ensure the sealing property of the gasket that attains sealing over the gas flow channel. This allows application of the thin separator plate, thus desirably reducing the dimensions of the stack of fuel cells and the cost of the material.

EMBODIMENT 8

This embodiment uses both a single-layered separator plate 211 and a complex separator plate obtained by combining two separator plates 221 and 231 with each other.

Figure 12:
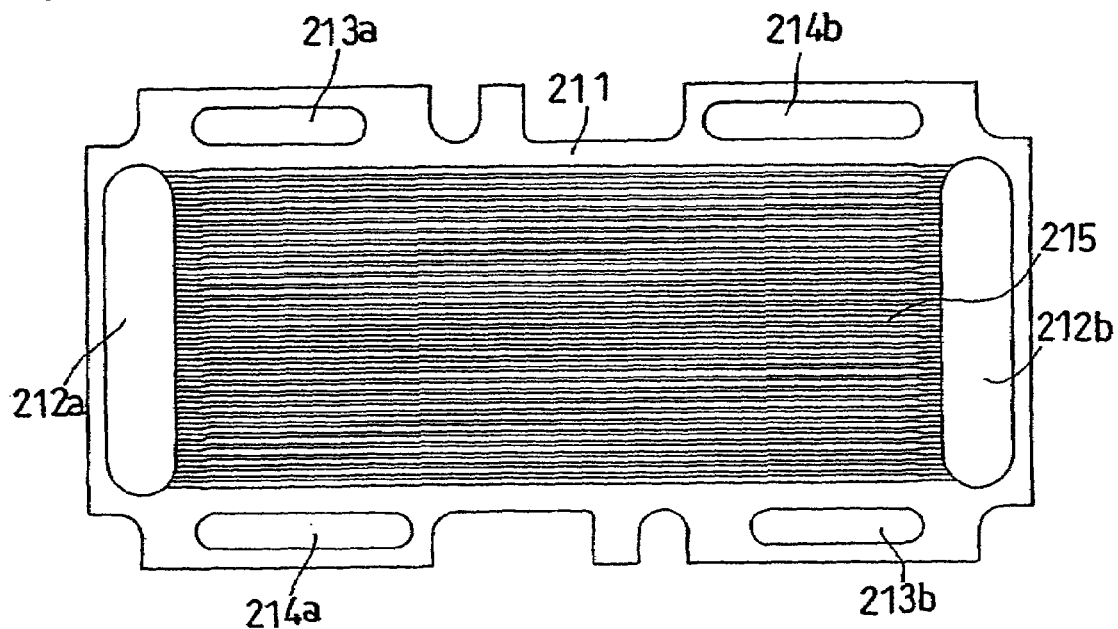
FIG. 12 is a front view illustrating a separator plate used for a fuel cell of Embodiment 8 according to the present invention, seen from the cathode side.

The separator plate 211 is described with reference to FIGS. 12 and 13. The separator plate 211 is a machined rectangular glassy carbon plate having a thickness of 2 mm, a height of 130 mm, and a width of 210 mm, and has a pair of manifold apertures 212a and 212b for the oxidant gas on short sides thereof, as well as a pair of manifold apertures 214a and 214b for the fuel gas and a pair of manifold apertures 213a and 213b for cooling water on longitudinal sides thereof. A plurality of grooves having a width of approximately 2 mm are cut at a pitch of 2.9 mm in a central area of 100 mm×190 mm on a face opposite to the cathode as a gas flow channel 215 connecting the manifold aperture 212a with the manifold aperture 212b. Grooves of the same width are cut at the same pitch in a serpentine layout on a rear face opposite to the anode as a gas flow channel 216 connecting the manifold aperture 214a with the manifold aperture 214b.

The oxidant gas flow channel 215 and the fuel gas flow channel 216 formed in the separator plate have different structures, since the flow rate of the air is about 25 times the flow rate of gaseous hydrogen. Changing the structure of the gas flow channel according to the gas flow rate ensures the optimum settings of the gas flow velocity and the gas pressure loss. The air flow channel 215 is positioned corresponding to the position of the gaseous hydrogen flow channel 216. This prevents an excessive shear force from being applied to the electrodes.

Figure 14:
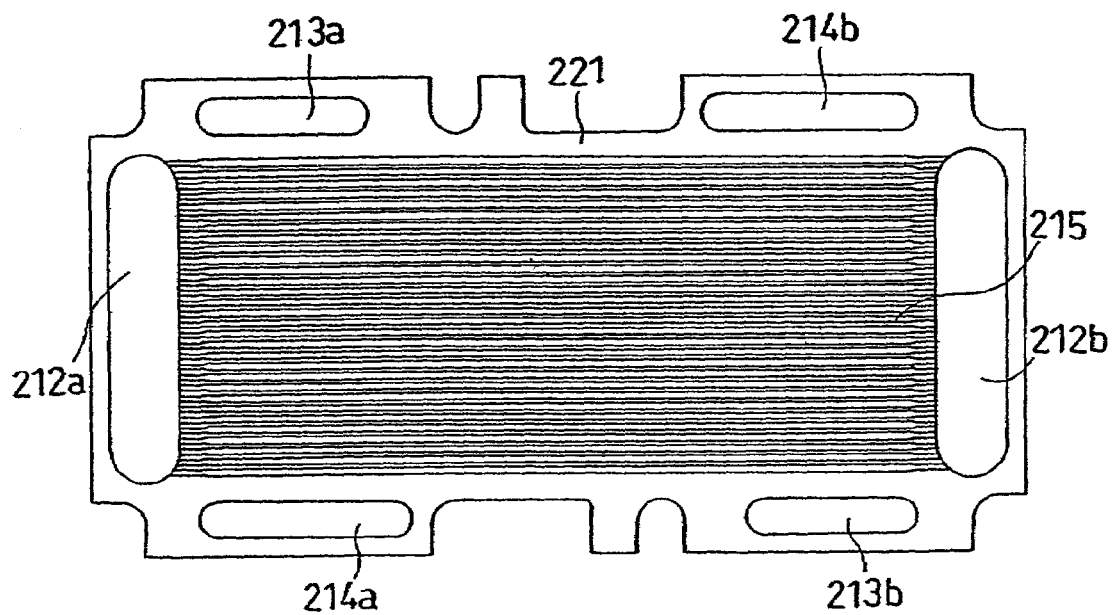
FIG. 14 is a front view illustrating another separator plate used for the fuel cell, seen from the cathode side.

As shown in FIGS. 14 and 15, the separator plate 221, one constituent of the complex separator plate, has the gas flow channel 215 of the above structure on a face opposite to the cathode and grooves of approximately 2 mm in width cut on the other face at a pitch of 5.8 mm as a cooling water flow channel 217 connecting the manifold aperture 213a with the manifold aperture 213b.

Figure 17:
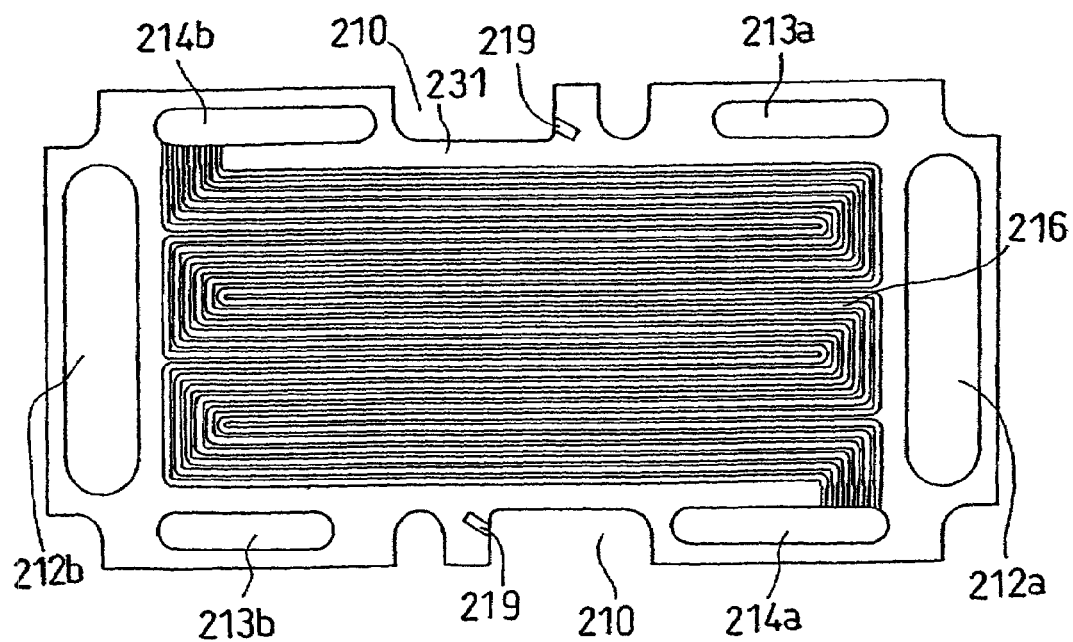
FIG. 17 is a rear view of the separator plate.

The other separator plate 231 has the gas flow channel 216 on a face opposite to the anode and the cooling water flow channel 217 on the other face as shown in FIGS. 16 and 17.

Figure 18:
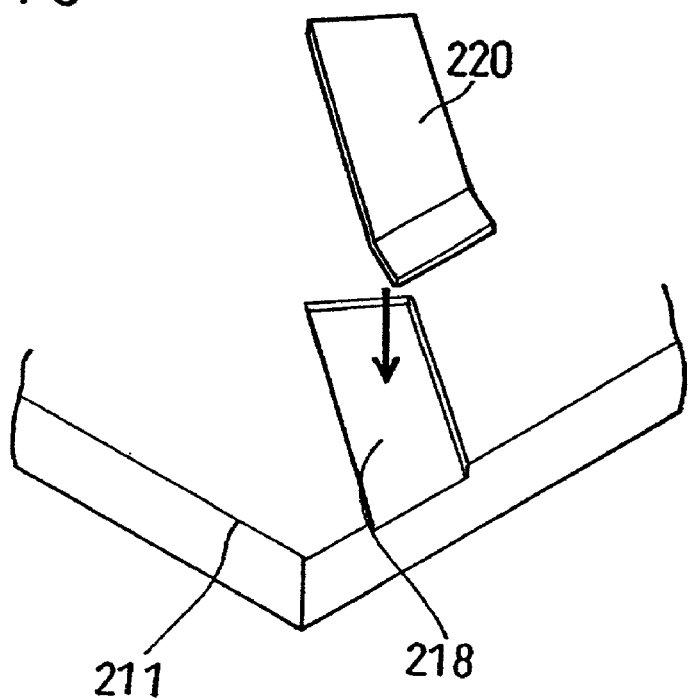
FIG. 18 is a perspective view illustrating a main part of the separator plate of FIG. 12 with a measurement terminal.

The separator plate 211 has recesses 218 formed in the face opposite to the anode to be open to upper and lower notches 210. In a similar manner, the separator plate 231 has recesses 219 formed in the face opposite to the anode to be open to upper and lower notches 210. The recesses 218 and 219 are set to be deviated from each other in the direction of the plane of the separator plate in an assembled cell laminate. In the illustrated example, the recesses 218 are positioned to be closer to the longitudinal ends of the separator plate than the recesses 219. These recesses 218 and 219 are used to receive terminals 220 for measurement of cell performances as shown in FIG. 18.

Figure 19:
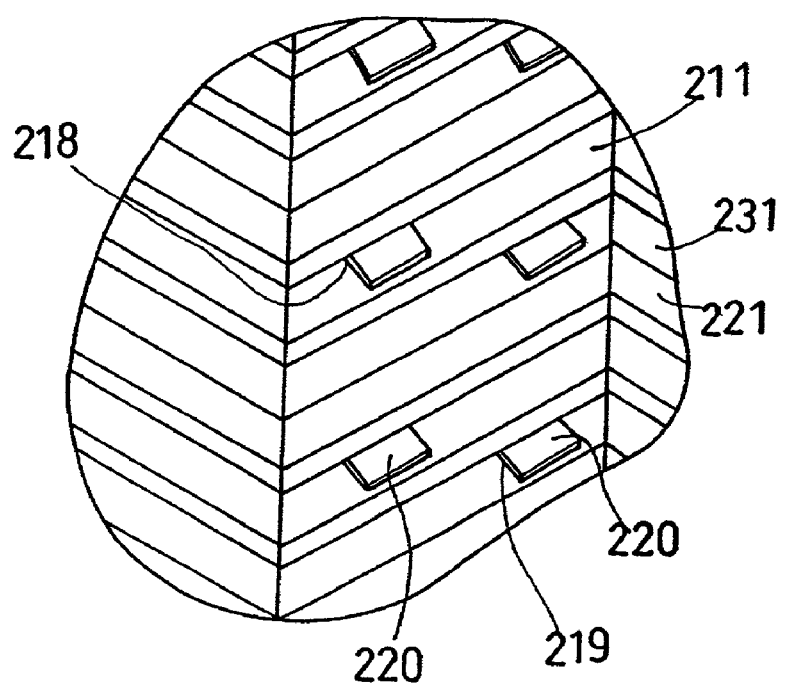
FIG. 19 is a perspective view illustrating a main part of the fuel cell.
Figure 23:
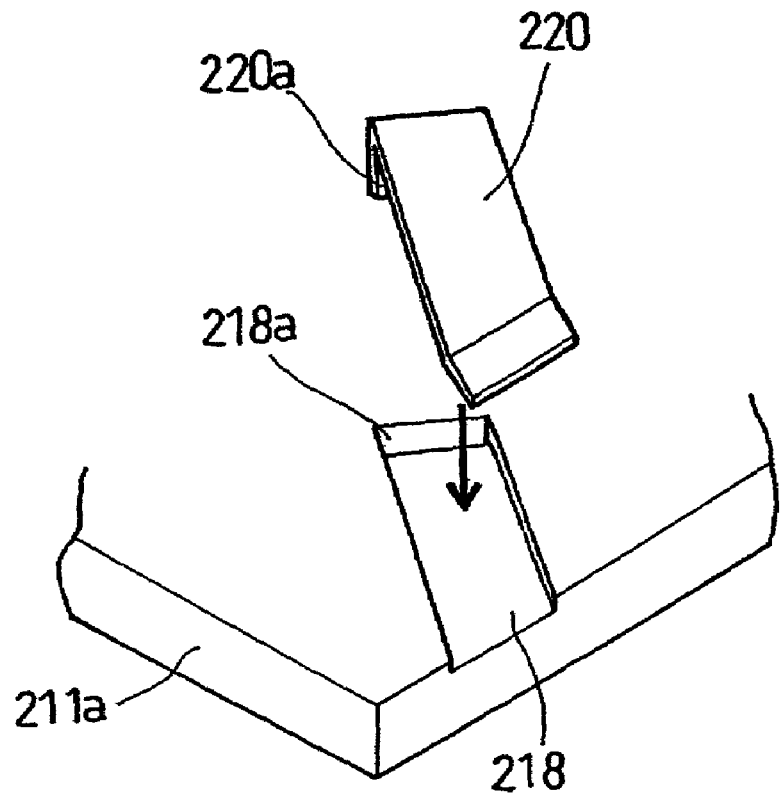
FIG. 23 is a perspective view illustrating a main part of the separator plate with a measurement terminal.

FIG. 20 is a sectional view illustrating a fuel cell laminate including electrolyte membrane-electrode assemblies (MEAs) laid one upon another via the separator plates discussed above, taken on a line XX-XX' of FIG. 13. An MEA 233 and a gasket 232 joined with the outer circumference of the MEA 233 are interposed between the separator plates 211. The complex separator plate consisting of the separator plates 221 and 231 is used at every two unit cells, instead of the separator plate 211. The end of the measurement terminal 220 is fitted, for example, in the lower recess out of each pair of the recesses 218 or 219 formed on the anode-side face of the separator plate 211 or 231, is pressed by the gasket 232, and is fixed by the clamping pressure of the cell stack. FIG. 19 shows the terminals 220 for measurement of cell performances attached to the anode side of the respective unit cells and protruded into the notches 210 of the separator plate. The positions of the recesses 218 and 219 formed in the respective separator plates 211 and 231 for receiving the measurement terminals 220 are deviated from each other in the direction of the plane of the separator plate. This arrangement effectively prevents a potential short circuit of the terminals between the adjoining unit cells.

In the structure of this embodiment, the terminals are attached in an identical orientation, while the positions of the recesses 218 and 219 are deviated from each other. Different orientations of the recesses 218 and 219 can reduce the required distance of the deviation. For example, the recess 219 may be designed to receive the terminal in another orientation parallel to the lower face of the separator plate or inward the cell, while the recess 218 is designed to receive the terminal in the illustrated orientation outward the cell.

In the separator plates and the gasket of this embodiment, the opening area of each fuel gas manifold aperture is greater than the opening area of each cooling water manifold aperture. The separator plates and the gasket are accordingly symmetrical about the center with regard to the contour and the manifold apertures, but not symmetrical about any centerline passing through the center. The recess 118 is also point symmetrical but not line symmetrical.

EMBODIMENT 9

A separator plate of this embodiment is shown in FIGS. 21 and 22. This separator plate 211a is identical with the separator plate 211 of Embodiment 8, except that a hole 218a leading to the rear face is formed in the deepest portion of each recess 218 to receive the terminal for measurement of cell performances. Although not specifically illustrated, a hole 219a leading to the rear face is also formed in the deepest portion of each recess 219 of the separator plate 231. This is used as a separator plate 231a.

The terminal 220 for measurement of cell performances used here has an L-shaped curved end attached to the recess 218. The curved end 220a is fitted in the hole 218a. In a similar manner, the terminal 220 for measurement of cell performances attached to the recess 219 has the curved end 220a. This arrangement effectively prevents the measurement terminal 220 from being accidentally slipped off the cell stack.

EMBODIMENT 10

Figure 24:
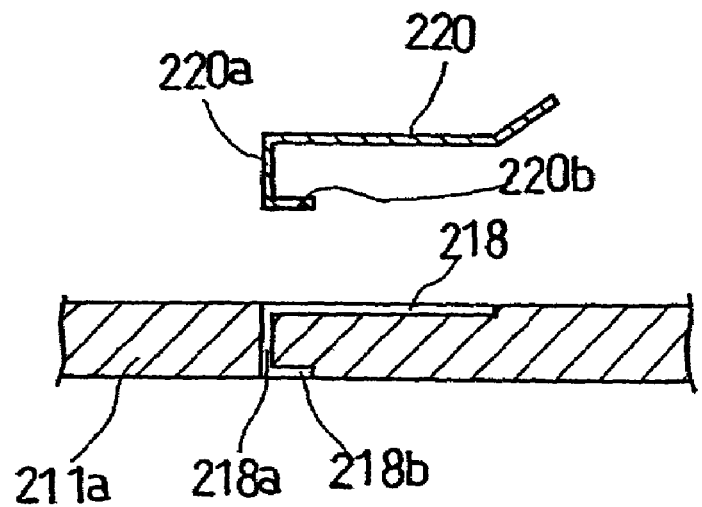
FIG. 24 is a sectional view illustrating a main part of a separator plate in Embodiment 10 of the present invention, together with a measurement terminal.

This embodiment enhances the fixation of the measurement terminal 220. Referring to FIG. 24, the separator plate 211 has a recess 218b formed on the rear face, in addition to the recess 218 with the hole 218a on the deepest portion thereof to receive the measurement terminal 220. The measurement terminal 220 has a folded tip 220b, which is fitted in the recess 218b on the rear face, while the curved end 220a is fitted in the hole 218a. This arrangement more effectively prevents the measurement terminal 220 from being accidentally slipped off the cell stack.

EXAMPLE 3

A catalyst powder for electrode reaction was prepared by carrying platinum particles having a mean particle diameter of approximately 30 angstrom on acetylene black powder at the weight ratio of 2 to 1. The resulting catalyst powder was dispersed in isopropyl alcohol. An ethyl alcohol dispersion of perfluorocarbon sulfonic acid powder expressed by Formula (1) given above, where x=1, y=2, m=5 through 13, and n≈1000, was mixed with the isopropyl alcohol dispersion to obtain a paste. The paste was printed on one plane of carbon non-woven fabric having a thickness of 250 µm by screen printing to form a catalyst layer. The quantity of platinum included in the catalyst layer was 0.5 mg/cm$^2$, and the quantity of perfluorocarbon sulfonic acid was 1.2 mg/cm$^2$.

The electrode thus obtained was used for both the anode and the cathode. These electrodes were joined with either face of the center portion of a hydrogen ion-conductive polymer electrolyte membrane having a little greater area than those of the electrodes by hot pressing, such that the printed catalyst layers are in contact with the electrolyte membrane. This gave an electrolyte membrane-electrode assembly (MEA). A thin film of the perfluorocarbon sulfonic acid having a thickness of 25 µm was used for the hydrogen ion-conductive polymer electrolyte membrane. A gasket of the butyl rubber sheet was joined with the outer circumference of the MEA to ensure the sufficient gas sealing property.

A cell laminate was obtained by laying 50 MEAs one upon another via the conductive separator plates. The conductive separator plates used here were the separator plate 211 according to Embodiment 8 and the complex separator plate, which consisted of the separator plates 221 and 231 with the cooling unit for the flow of cooling water and was inserted at every two unit cells. The terminals 220 for measurement of cell performances were fitted in advance in the recesses 218 and 219 of the separator plates 211 and 231. A stack of fuel cells in Example 3 was completed by arranging a pair of stainless steel end plates across the cell laminate via collector plates and insulator plates and clamping the two end plates with fixation rods under a pressure of 2.0 MPa/m$^2$.

In the assembled stack of fuel cells, the terminal 220 for measurement of cell performances was interposed between each adjoining pair of the separator plate and the gasket and securely fixed by the clamping force. The flat measurement terminal 220 had a sufficiently large size and was readily connectable with a measurement device to ensure measurement of the cell performances with high reliability. The required gas sealing property in the combination of the separator plate with the MEA was attained by the gasket joined with the MEA. The required gas sealing property in the complex separator plate consisting of the separator plates 221 and 231 was attained by joining the faces of the separator plates defining the cooling water flow channel with each other via a liquid gasket.

The polymer electrolyte fuel cell of Example 3 was kept at 75° C. A supply of gaseous hydrogen humidified and heated to have a dew point of 70° C. was fed to one electrode, while a supply of the air humidified and heated to have a dew point of 65° C. was fed to the other electrode. The voltage of each unit cell was measured with the voltage measurement terminal. Under the non-loading condition with no output of the electric current, the fuel cell stack of Example 3 showed an open voltage of 50 V.

In the measurement of performances of unit cells in a stack of fuel cells using carbon separator plates, previous fixation of the metal terminals to the respective separator plates desirably prevents potential destruction of the separator plate due to insertion of pins in the prior art construction. This arrangement does not require holes formed in the separator plate to receive the inserted pins, thus desirably reducing the manufacturing cost in mass production of separator plates. The prior art technique of pressing a jig against the separator plate may cause failure of the contact of the pin with the separator plate, which leads to the low reliability in measurement of the voltage. The technique of the present invention, on the other hand, fixes the measurement terminal and ensures the contact of the terminal with the separator plate, thus being free from potential failure of the contact. The prior art pin has the potential problem as the part and may be broken in the course of preparation for measurement of the voltage. The technique of the present invention, on the other hand, utilizes the terminal of the simpler structure, thus enhancing the reliability of the part.

EXAMPLE 4

Figure 25:
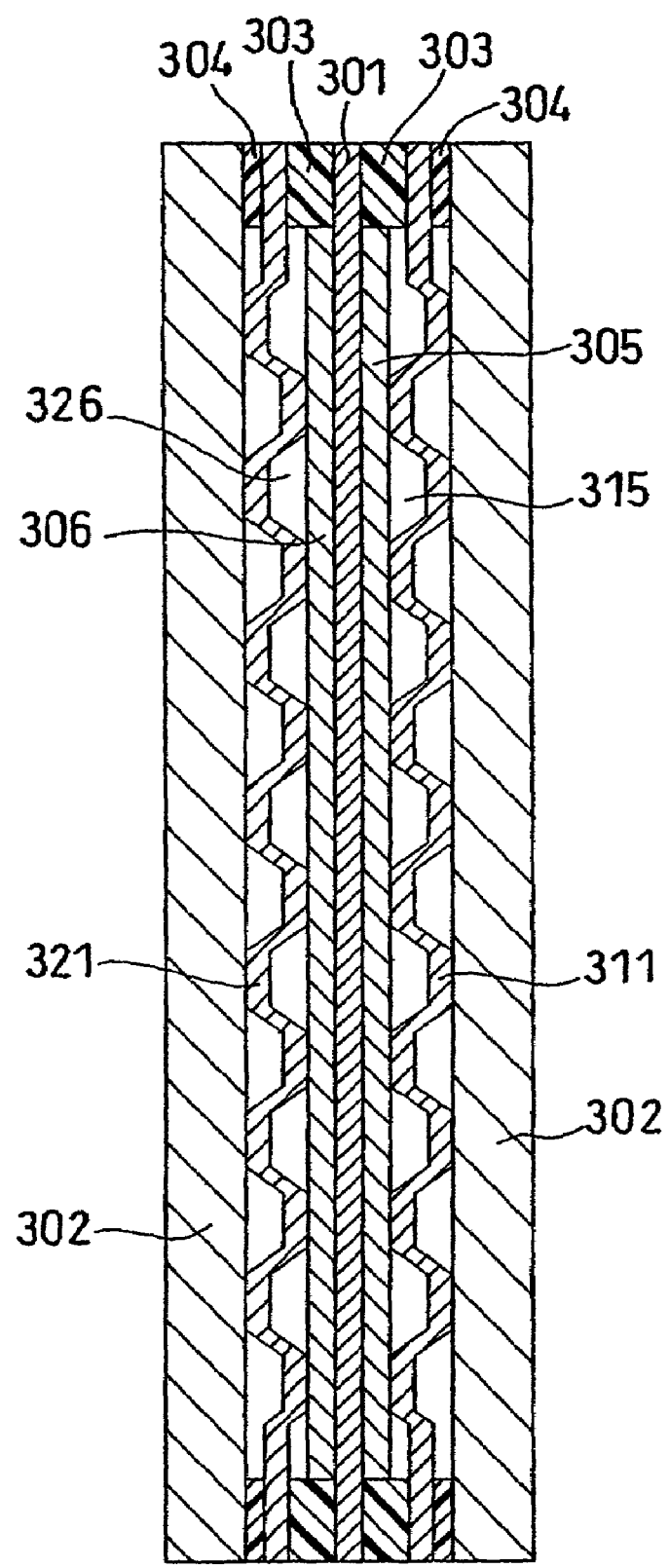
FIG. 25 is a sectional view showing a unit cell in a stack of fuel cells in another embodiment.

FIG. 25 is a sectional view illustrating a unit cell in a stack of polymer electrolyte fuel cells of Example 4, taken on a line XXV-XXV' of FIG. 26. FIG. 26 is a front view illustrating a metal separator plate seen from the cathode side. The construction drawings of FIG. 25 and FIG. 27 and subsequent figures are only to facilitate the understanding and do not accurately reflect the relative dimensions and sizes of the respective constituents.

Referring to FIG. 25, a cathode 305 and an anode 306 are bonded to either face of a polymer electrolyte membrane 301 to form an MEA. A cathode-side conductive separator plate 311, an anode-side conductive separator plate 321, and a pair of collector plates 302 are arranged across the MEA. This gives a unit cell. A stack of fuel cells is obtained by connecting a plurality of the unit cells in series.

As shown in FIG. 26, the cathode-side conductive separator plate 311 is a machined rectangular metal plate, and has a pair of manifold apertures 312a and 312b for the oxidant gas on short sides thereof, as well as a pair of manifold apertures 314a and 314b for the fuel gas and a pair of manifold apertures 313a and 313b for cooling water. An oxidant gas flow channel 315 is formed on the surface of the separator plate 311 opposite to the cathode to connect the manifold aperture 311a with the manifold aperture 311b. In the same manner as the cathode-side separator plate, the three types of manifold apertures are formed in the anode-side separator plate 321. A fuel gas flow channel 326 is formed on the surface of the separator plate 321 opposite to the anode to connect the manifold aperture 314a for the fuel gas with the manifold aperture 314b.

In this example, the anode-side conductive separator plate and the cathode-side conductive separator plate were produced independently. In one possible modification, one separator plate may be used for both the anode-side conductive separator plate and the cathode-side conductive separator plate. For example, the surface of the separator plate functions as the anode-side conductive separator plate, and the rear face functions as the cathode-side conductive separator plate.

The method of producing the MEA is discussed in detail. The procedure applied a mixture of an electrode catalyst of acetylene black with platinum particles carried thereon and perfluorocarbon sulfonic acid on carbon non-woven fabric to give an anode and a cathode of the same construction. The procedure then joined these electrodes with either face of the center portion of a hydrogen ion-conductive polymer electrolyte membrane (Nafion film manufactured by E.I. Du Pont de Nemours & Co. Inc.) having a little greater area than those of the electrodes by hot pressing to give an MEA, such that the catalyst layers of the anode and the cathode were in contact with the electrolyte membrane. The perfluorocarbon sulfonic acid included in the catalyst layer was Flemion manufactured by Asahi Glass Co., Ltd.

The method of manufacturing the conductive separator plate is discussed below with reference to FIG. 27.

The procedure first presses a stainless steel SUS316 plate 51 to a wavy form (b). Grooves 52 constituting a gas flow channel are accordingly formed in one face, whereas grooves 53 constituting another gas flow channel are formed in the other face. The procedure subsequently protects areas other than the gas flow channels with a resist 54 (c), and roughens the surface of the gas flow channels to have concaves and convexes by sand blasting (d). The etching technique may be applied to make the concaves and convexes on the surface, instead of the sand blasting technique. For example, in the case of stainless steel, an aqueous solution of iron(II) chloride is used for etching. After roughening the surface of the gas flow channels, the procedure removes the resist 54 (e). This series of processing makes the gas flow channels hydrophilic without increasing the contact resistance between the adjoining separator plates. One modified procedure of producing the separator plate may roughen a required area of a metal plate and press the metal plate to a wavy form.

A cell laminate is obtained by laying 50 unit cells of the MEAs and the separator plates one upon another. The procedure then arranges a pair of stainless steel end plates across the cell laminate via collector plates and insulator plates and clamps the whole stack with fixation rods under a pressure of 2.0 MPa.

A thin film of silicone grease is applied to the joint of the separator plate with the MEA and the joint of the separator plates to ensure the sufficient gas sealing properties without significantly decreasing the electric conductivity.

A stack of fuel cells using stainless steel SUS316 separator plates without the roughened surface of the gas flow channels was used as a comparative example.

The stack of fuel cells in this embodiment using the stainless steel SUS316 separator plates having the roughened surface of the gas flow channels by blasting and the stack of fuel cells in the comparative example were kept at temperatures of 80 to 90° C. A supply of gaseous hydrogen humidified and heated to have a dew point of 75 to 85° C. was fed to the anode side, while a supply of the air humidified and heated to have a dew point of 70 to 80° C. was fed to the cathode side. Under the non-loading condition with no output of the electric current, the fuel cell stack of Example 4 showed an open voltage of 50 V. These fuel cells were subjected to a continuous power generation test under the following conditions: the fuel utilization rate of 80%, the oxygen utilization rate of 40%, and the current density of 0.5 A/cm$^2$. Variations in output characteristic against time are shown in FIG. 28.

The cell of the comparative example lowered the output with elapse of time, whereas the cell of Example 4 maintained the output level of approximately 1000 W (22V-45 A) over 8000 hours. In the cell of Example 4, the surface of the gas flow channels in the separator plate is roughened to have concaves and convexes. This arrangement desirably reduces a variation or decrease in output over a long driving time. Although SUS316 was used for the metal base plate of the separator plate in this example, another stainless steel, Al, or Ti are also applicable for the same purpose.

EXAMPLE 5

In this embodiment, a metal oxide film was formed in the gas flow channel of the metal separator plate. The conductive separator plates were produced according to the procedure discussed in Example 4. FIG. 29 is a sectional view showing a process of producing the conductive separator plates. The procedure pressed a stainless steel SUS316 plate 51 to a wavy form (b), protected areas other than the gas flow channels with a resist 54 (c), and formed an Al$_2$O$_3$ film 55 on the surface of the gas flow channels by rf magnetron sputtering (d). The thickness of the film was 0.2 μm. Aluminum metal was used for the target. The conditions of the formation were: a 1 Pa argon atmosphere, an rf power of 300 W, a formation time of 85 minutes, and a base plate temperature of 200° C. The base plate was cleaned by reverse sputtering for removal of a natural oxide film on the surface, prior to the formation (this process was also carried out in the subsequent examples). Diverse oxide films were formed according to the same procedure. The conditions of the formation are shown in Table 1. Metal oxides may be used for the target.

TABLE 1

| Metal Oxide Film | Target |
| --- | --- |
| TiO$_2$ | Ti |
| Cr$_2$O$_3$ | Cr |
| Nb$_2$O$_3$ | Nb |
| ZrO$_2$ | Zr |
| W$_2$O$_3$ | W |
| La$_2$O$_3$ | La |

TABLE 1-continued

| Metal Oxide Film | Target |
| --- | --- |
| V$_2$O$_3$ | V |
| Ta$_2$O$_5$ | Ta |

Conditions of Film Formation:
Base Plate Temperature: up to 200° C., Ar: 20 sccm
Plasma Power = 300 W, Film Formation Time = 85 min
Film Thickness = 0.2 μm After formation of the metal oxide film on the surface of the gas flow channel, the resist was removed. This made the gas flow channel hydrophilic without increasing the contact resistance between the separator plates. One modified procedure sets the resist 54 on the metal plate 51, forms the metal oxide film 55 at a predetermined position, and then presses the metal plate 51 to a wavy form.

The metal base plates having the surface treated gas flow channels were used as the separator plates, and a stack of fuel cells was assembled according to the procedure discussed in Example 4. The stack of fuel cells was subjected to the continuous power generation test under the same conditions as those of Example 4. Table 2 shows the observed cell outputs at the initial time (10 hours after a start of driving) and after the continuous driving of 8000 hours and a variation in output with regard to the diverse metal oxide films. The variation in output represents a difference between the maximum value and the minimum value of the output at every driving time of 100 hours to the initial output value. Formation of the metal oxide film desirably reduces a change of the output voltage against time and a variation in output.

TABLE 2

| | Output (W) | | |
| --- | --- | --- | --- |
| Metal Oxide Film | Initial | After 8000 hours | Variation in Output(%) |
| Al$_2$O$_3$ | 1180 | 1120 | 0.4 |
| TiO$_2$ | 1180 | 1125 | 0.2 |
| Cr$_2$O$_3$ | 1170 | 1120 | 0.5 |
| Nb$_2$O$_3$ | 1160 | 1120 | 0.3 |
| ZrO$_2$ | 1190 | 1135 | 0.4 |
| W$_2$O$_3$ | 1140 | 1080 | 0.7 |
| La$_2$O$_3$ | 1145 | 1090 | 0.8 |
| V$_2$O$_3$ | 1135 | 1075 | 0.6 |
| Ta$_2$O$_5$ | 1125 | 1065 | 0.5 |

The metal oxide film formed on the gas flow channel is not required to completely cover over the whole gas flow channel. For example, islands of a metal oxide layer 56 as shown in FIG. 31 are sufficient. The total area of the metal oxide layers in islands was 50% of the surface of the gas flow channel. It is preferable that the total area is not less than 25%.

The direct formation of the metal oxide film on the metal base plate gives the stronger adhesion than that of the prior art hydrophilicity processing agent. This technique of the present invention thus effectively reduces the variation in output of the fuel cell due to water clogging.

EXAMPLE 6

In this example, a multi-layered metal oxide film was formed on the gas flow channel in the separator plate by the rf magnetron sputtering technique according to the procedure discussed in Example 5. The thickness of the film was approximately 0.2 μm. The content of metal atoms in the metal oxide film was gradually decreased from the interface between the metal oxide film and the metal base plate to the surface of the metal oxide film.

The method of controlling the $O_2$ flow rate in the sputtering gas and the method of controlling the rf power were applied to regulate the content of the metal atoms included in the metal oxide film. Table 3 shows the conditions of film formation in the method of controlling the $O_2$ flow rate in the sputtering gas. Table 4 shows the conditions of film formation in the method of controlling the rf power.

TABLE 3

| Metal Oxide Film Material | Target | Film Thickness of Each Layer (μm) | $O_2$ Flow Rate $O_2/(At + O_2)$ |
|---|---|---|---|
| $Al_2O_3$ | Al | 0.07 | 0, 0.02, 0.04, 0.06, 0.08, 0.1 |
| $TiO_2$ | Ti | 0.07 | 0, 0.02, 0.04, 0.06, 0.08, 0.1 |
| $Cr_2O_3$ | Cr | 0.07 | 0, 0.02, 0.04, 0.06, 0.08, 0.1 |
| $Nb_2O_3$ | Nb | 0.07 | 0, 0.02, 0.04, 0.06, 0.08, 0.1 |
| $ZrO_2$ | Zr | 0.07 | 0, 0.02, 0.04, 0.06, 0.08, 0.1 |
| $W_2O_3$ | La | 0.07 | 0, 0.02, 0.04, 0.06, 0.08, 0.1 |
| $La_2O_3$ | V | 0.07 | 0, 0.02, 0.04, 0.06, 0.08, 0.1 |
| $V_2O_3$ | W | 0.07 | 0, 0.02, 0.04, 0.06, 0.08, 0.1 |
| $Ta_2O_5$ | Ta | 0.07 | 0, 0.02, 0.04, 0.06, 0.08, 0.1 |

Conditions of Film Formation:
Base Plate Temperature: No heating to 300° C.
Ar + $O_2$ = 20 sccm, Plasma Power = 500 W
Film Formation Time = 6 min

TABLE 4

| Metal Oxide Film Material | Target | Film Thickness of Each Layer (μm) | rf-Power (W) |
|---|---|---|---|
| $Al_2O_3$ | Al | 0.07 | 300, 500, 700, 900 |
| $TiO_2$ | Ti | 0.07 | 300, 500, 700, 900 |
| $Cr_2O_3$ | Cr | 0.07 | 300, 500, 700, 900 |
| $Nb_2O_3$ | Nb | 0.07 | 300, 500, 700, 900 |
| $ZrO_2$ | Zr | 0.07 | 300, 500, 700, 900 |
| $W_2O_3$ | La | 0.07 | 300, 500, 700. 900 |
| $La_2O_3$ | V | 0.07 | 300, 500, 700, 900 |
| $V_2O_3$ | W | 0.07 | 300, 500, 700, 900 |
| $Ta_2O_5$ | Ta | 0.07 | 300, 500, 700, 900 |

Conditions of Film Formation:
Base Plate Temperature: No heating to 300° C.
$O_2/(Ar + O_2)$ = 0.06, Film Formation Time = 8 min Six-layered metal oxide films were formed in the method of controlling the $O_2$ flow rate in the sputtering gas. Four-layered metal oxide films were formed in the method of controlling the rf power. The content of the metal atoms included in the metal oxide film may be varied continuously by continuously changing the parameters of film formation. Such application is effective in the present invention.

The gradient in content of the metal element included in the metal oxide film enhances the adhesion of the metal oxide film to the metal separator plate, relieves the remaining stress of the film, and prevents formation of a pin hole. This arrangement thus significantly improves the stability of the fuel cells.

A stack of fuel cells was assembled according to the procedure discussed in Example 4 by using the conductive metal separator plates with the metal oxide film formed on the gas flow channels to have a gradient in content of the metal element. The stack of fuel cells was subjected to the continuous power generation test under the same conditions as those of Example 4. Table 5 shows the observed cell outputs at the initial time (10 hours after a start of driving) and after the continuous driving of 8000 hours and a variation in output. The gradient in content of the metal element included in the metal oxide film desirably reduces a change of the output voltage against time and a variation in output.

TABLE 5

| Metal Oxide Film | | Output (W) Initial | Output (W) After 8000 hours | Variation in Output(%) |
|---|---|---|---|---|
| $Al_2O_3$ | $N_2$ Flow Rate | 1120 | 1070 | 0.2 |
| | rf Power | 1020 | 1010 | 0.3 |
| $TiO_2$ | $N_2$ Flow Rate | 1130 | 1085 | 0.1 |
| | rf Power | 1080 | 1040 | 0.4 |
| $Cr_2O_3$ | $N_2$ Flow Rate | 1110 | 1060 | 0.3 |
| | rf Power | 1045 | 1010 | 0.4 |
| $Nb_2O_3$ | $N_2$ Flow Rate | 1050 | 1000 | 0.2 |
| | rf Power | 1005 | 955 | 0.2 |
| $ZrO_2$ | $N_2$ Flow Rate | 1125 | 1070 | 0.3 |
| | rf Power | 1070 | 1015 | 0.3 |
| $W_2O_3$ | $N_2$ Flow Rate | 1050 | 1005 | 0.5 |
| | rf Power | 1015 | 965 | 0.6 |
| $La_2O_3$ | $N_2$ Flow Rate | 1040 | 955 | 0.8 |
| | rf Power | 985 | 940 | 0.9 |
| $V_2O_3$ | $N_2$ Flow Rate | 1060 | 1000 | 0.4 |
| | rf Power | 995 | 950 | 0.5 |
| $Ta_2O_5$ | $N_2$ Flow Rate | 1040 | 960 | 0.4 |
| | rf Power | 980 | 935 | 0.5 |

EXAMPLE 7

In this embodiment, a metal oxide film was formed on the surface of the gas flow channels in the separator plate by heat treatment. The conductive separator plates were produced according to the procedure discussed in Example 4. The procedure pressed a stainless steel SUS316 plate to a wavy form, protected areas other than the gas flow channels with a resist, and heat treated the separator plate in the air at 200° C. for 1 hour. A metal oxide film accordingly grew on the gas flow channels. For example, an aluminum oxide film and a titanium oxide film respectively grow on an Al base plate and a Ti base plate as anti-corrosion films. When stainless steel is used for the metal base plate, a metal oxide film mainly composed of chromium oxide grows on the metal base plate.

A stack of fuel cells was assembled according to the procedure discussed in Example 4 by using the conductive metal separator plates with the metal oxide film formed on the gas flow channels. The stack of fuel cells was subjected to the continuous power generation test under the same conditions as those of Example 4. Table 6 shows the observed cell outputs at the initial time (10 hours after a start of driving) and after the continuous driving of 8000 hours and a variation in output.

TABLE 6

| Metal Oxide Film | Output (W) Initial | Output (W) After 8000 hours | Variation in Output (%) |
|---|---|---|---|
| $Al_2O_3$ | 1170 | 1110 | 0.5 |
| $TiO_2$ | 1190 | 1135 | 0.4 |
| $Cr_2O_3$ | 1185 | 1130 | 0.6 |

TABLE 6-continued

| Metal Oxide Film | Output (W) Initial | Output (W) After 8000 hours | Variation in Output (%) |
|---|---|---|---|
| $ZrO_2$ | 1205 | 1145 | 0.5 |
| $Ta_2O_5$ | 1140 | 1080 | 0.7 |

EXAMPLE 8

A metal oxide film was formed on the surface of the gas flow channels in the separator plate according to the procedure discussed in Example 5, 6, or 7. The thickness of the metal oxide film was in a range of 0.5 to 0.05 µm.

The procedure then roughened the surface of the metal oxide film. The method applicable to roughen the surface may be the sand blasting technique adopted in Example 4 or an ion etching technique. The procedure of this embodiment carried out ion etching with an Ar gas under the conditions of 10 Pa and 300 W for 5 minutes.

A stack of fuel cells was assembled according to the procedure discussed in Example 4 and was subjected to the continuous power generation test under the same conditions as those of Example 4. Table 7 shows the observed cell outputs at the initial time (10 hours after a start of driving) and after the continuous driving of 8000 hours. The roughened surface of the metal oxide film reduced the change of the output against time and lowered the variation in output, compared with the results of Example 5.

TABLE 7

| Metal Oxide Film | Output (W) Initial | Output (W) After 8000 hours | Variation in Output (%) |
|---|---|---|---|
| $Al_2O_3$ | 1195 | 1145 | 0.2 |
| $TiO_2$ | 1190 | 1140 | 0.1 |
| $Cr_2O_3$ | 1185 | 1135 | 0.3 |
| $Nb_2O_3$ | 1180 | 1140 | 0.2 |
| $ZrO_2$ | 1195 | 1140 | 0.3 |
| $W_2O_3$ | 1160 | 1095 | 0.5 |
| $La_2O_3$ | 1160 | 1105 | 0.6 |
| $V_2O_3$ | 1150 | 1090 | 0.4 |
| $Ta_2O_5$ | 1140 | 1080 | 0.4 |

EXAMPLE 9

The procedure first roughened the surface of the gas flow channels in the separator plate according to the procedure discussed in Example 4. A metal oxide film was then formed on the roughened surface of the gas flow channels in the separator plate according to the procedure discussed in Example 5, 6, or 7. The thickness of the metal oxide film was in a range of 0.5 to 0.05 µm.

A stack of fuel cells was assembled according to the procedure discussed in Example 4 and was subjected to the continuous power generation test under the same conditions as those of Example 4. Table 8 shows the observed cell outputs at the initial time (10 hours after a start of driving) and after the continuous driving of 8000 hours. Formation of the metal oxide film on the roughened surface of the metal plate reduced the change of the output against time and lowered the variation in output, compared with the results of Example 4.

TABLE 8

| Metal Oxide Film | Output (W) Initial | Output (W) After 8000 hours | Variation in Output (%) |
|---|---|---|---|
| $Al_2O_3$ | 1170 | 1125 | 0.4 |
| $TiO_2$ | 1170 | 1135 | 0.2 |
| $Cr_2O_3$ | 1160 | 1120 | 0.5 |
| $Nb_2O_3$ | 1150 | 1115 | 0.3 |
| $ZrO_2$ | 1180 | 1135 | 0.4 |
| $W_2O_3$ | 1130 | 1085 | 0.7 |
| $La_2O_3$ | 1135 | 1095 | 0.8 |
| $V_2O_3$ | 1125 | 1080 | 0.6 |
| $Ta_2O_5$ | 1115 | 1070 | 0.6 |

EXAMPLE 10

A metal oxide film was formed on the roughened surface of the gas flow channels in the separator plate according to the procedure discussed in Example 4, 5, or 6. The thickness of the metal oxide film was in a range of 0.5 to 0.05 µm.

A resulting stack of fuel cells was driven by two different methods: (driving method A): continuously driving for 8000 hours and (driving method B): feeding a supply of an oxidant gas to both the fuel gas flow channel and the oxidant gas flow channel at every 2000 hours of driving time. Gaseous oxygen was used for the oxidant gas in the driving method B. The flow rate of gaseous oxygen is 1.5 times the flow rate in the normal driving state of the fuel cells. The flow time of gaseous oxygen is in a range of 5 minutes to 10 hours and is preferably not less than 1 hour. Table 9 shows the observed change of the output with regard to the sample fuel cell stacks manufactured according to the procedure of Example 5. The air or oxygen is preferably used for the oxidant gas.

TABLE 9

| Metal Oxide Film | Driving Method | Output (W) Initial | Output (W) After 8000 hours | Variation in Output (%) |
|---|---|---|---|---|
| $Al_2O_3$ | A | 1180 | 1120 | 0.4 |
|  | B | 1180 | 1135 | 0.3 |
| $TiO_2$ | A | 1180 | 1125 | 0.2 |
|  | B | 1180 | 1140 | 0.15 |
| $Cr_2O_3$ | A | 1170 | 1120 | 0.5 |
|  | B | 1170 | 1135 | 0.4 |
| $Nb_2O_3$ | A | 1160 | 1120 | 0.3 |
|  | B | 1160 | 1130 | 0.2 |
| $ZrO_2$ | A | 1190 | 1135 | 0.4 |
|  | B | 1190 | 1150 | 0.2 |
| $W_2O_3$ | A | 1140 | 1080 | 0.7 |
|  | B | 1140 | 1095 | 0.5 |
| $La_2O_3$ | A | 1145 | 1090 | 0.8 |
|  | B | 1145 | 1105 | 0.6 |
| $V_2O_3$ | A | 1135 | 1075 | 0.6 |
|  | B | 1135 | 1090 | 0.4 |
| $Ta_2O_5$ | A | 1125 | 1065 | 0.6 |
|  | B | 1125 | 1080 | 0.4 |

The driving method of this example cleans the metal oxide film formed on the gas flow channels, while recovering the defect and reproducing the metal oxide film on the surface of the gas flow channels. This arrangement desirably prevents the gas flow channels from being clogged by bedewed or produced water and thereby reduces the change of the output voltage against time and a variation in output.

INDUSTRIAL APPLICABILITY

The present invention gives a proper orientation of the surface and the rear face to the separator plates and the MEAs, and completely prevents the separator plates and the MEAs from being laid in a reverse direction in the course of assembling the cell stack. The present invention also enhances the distribution of the reaction gas and thus significantly improves a variation in voltage among the cells in the cell stack.

The invention claimed is:

1. A polymer electrolyte fuel cell comprising a hydrogen ion-conductive polymer electrolyte membrane, an anode and a cathode sandwiching said hydrogen ion-conductive polymer electrolyte membrane, an anode-side conductive separator plate having a gas flow channel for supplying a fuel gas to said anode, and a cathode-side conductive separator plate having a gas flow channel for supplying an oxidant gas to said cathode, wherein each of said anode-side conductive separator plate and said cathode-side conductive separator plate is rectangle in shape and has an oxidant gas manifold aperture for an inlet arranged on one short side thereof, an oxidant gas manifold aperture for an outlet arranged on the other short side thereof, a fuel gas manifold aperture for an inlet and a fuel gas manifold aperture for an outlet arranged on different longitudinal sides thereof, and a cooling water manifold aperture for an inlet and a cooling water manifold aperture for an outlet arranged on the different longitudinal sides thereof, the respective fuel gas manifold apertures are disposed opposite to the cooling water manifold apertures, the oxidant gas manifold apertures, the cooling water manifold apertures, and the fuel gas manifold apertures, have opening areas decreasing in this order, and the fuel gas manifold apertures for the inlet and outlet and the oxidant gas manifold apertures for the inlet and outlet are directly connected with the gas flow channel for supplying the fuel gas to the anode and the gas flow channel for supplying the oxidant gas to the cathode, respectively, wherein the fuel gas manifold apertures and the cooling water manifold apertures arranged in each of said conductive separator plates are symmetrical about the center of said conductive separator plate, but are not symmetrical about any centerline passing through the center.

2. A polymer electrolyte fuel cell in accordance with claim 1, wherein a contour of each of said conductive separator plates is symmetrical about the center of said conductive separator plate but is not symmetrical about any centerline passing through the center.

3. A polymer electrolyte fuel cell in accordance with claim 1, wherein each opening area of the oxidant gas manifold apertures, the fuel gas manifold apertures, and the cooling water manifold apertures is 60 to 300% of a total sectional area of the gas flow channel of the oxidant gas, the gas flow channel of the fuel gas, or a flow channel of the cooling water in a whole stack of said fuel cells.

4. A polymer electrolyte fuel cell in accordance with claim 1, said polymer electrolyte fuel cell further comprising gaskets disposed on respective outer circumferences of said anode and said cathode, wherein at least one of said conductive separator plates has a groove formed outside a specific part of the gas flow channel communicating with the manifold aperture.

5. A polymer electrolyte fuel cell in accordance with claim 4, wherein the groove does not connect the gas flow channel with the manifold aperture.

6. A polymer electrolyte fuel cell in accordance with claim 4, wherein the groove does not connect the gas manifold aperture for the inlet with the gas manifold aperture for die outlet.

7. A polymer electrolyte fuel cell in accordance with claim 4, wherein the groove has a length tat is longer than a length of the specific part of the gas flow channel, which communicates with the manifold aperture and is in direct contact with said gasket, in a flow direction.

8. A polymer electrolyte fuel cell in accordance with claim 5, wherein the groove bas a length that is longer than a length of the specific part of the gas flow channel, which communicates with the manifold aperture and is in direct contact with said gasket, in a flow direction.

9. A polymer electrolyte fuel cell in accordance with claim 6, wherein the groove has a length that is longer than a length of the specific part of the gas flow channel, which communicates with the manifold aperture and is in direct contact with said gasket, in a flow direction.

10. A polymer electrolyte fuel cell comprising a hydrogen ion-conductive polymer electrolyte membrane, an anode and a cathode sandwiching said hydrogen ion-conductive polymer electrolyte membrane, an anode-side conductive separator plate having a gas flow channel for supplying a fuel gas to said anode, and a cathode-side conductive separator plate having a gas flow channel for supplying an oxidant gas to said cathode, wherein each of said anode-side conductive separator plate and said cathode-side conductive separator plate is rectangle in shape and has an oxidant gas manifold aperture for an inlet arranged on one short side thereof, an oxidant gas manifold aperture for an outlet arranged on the other short side thereot, a fuel gas manifold aperture for an inlet and a fuel gas manifold aperture for an outlet arranged on different longitudinal sides thereof, and a cooling water manifold aperture for an inlet and a cooling water manifold aperture fur an outlet arranged on the different longitudinal sides thereof, the respective fuel gas manifold apertures are disposed opposite to the cooling water manifold apertures, and the oxidant gas manifold apertures, the cooling water manifold apertures, and the fuel gas manifold apertures, have opening areas decreasing in this order, wherein one of said conductive separator plates has a recess formed on a surface thereof to be open to outside, and a flat terminal for measurement of cell performance is attached to said recess.

11. A polymer electrolyte fuel cell in accordance with claim 10, wherein said recess of said conductive separator plate, to which said terminal for measurement of cell performance is attached, is formed at different positions in adjoining unit cells.

12. A polymer electrolyte fuel cell in accordance with claim 10, wherein said recess of said conductive separator plate, to which said terminal for measurement of cell performance is attached, is formed in different orientations in adjoining unit cells.

13. A polymer electrolyte fuel cell in accordance with claim 12, wherein said recess has a hole in a deepest portion thereof, and said terminal for measurement of cell performance has an L-shaped curved end, which is fitted in the hole.

14. A polymer electrolyte fuel cell in accordance with claim 13, wherein said terminal for measurement of cell performance has a folded tip on the curved end, and the folded tip is received in a recess formed in a rear face of said conductive separator plate.

15. A polymer electrolyte fuel cell in accordance with claim 1, wherein each of said conductive separator plates is a metal plate and has roughened surface including concaves and convexes formed in at least part of the gas flow channel.

16. A polymer electrolyte fuel cell in accordance with claim 1, wherein each of said conductive separator plates comprises a metal plate and has a metal oxide layer formed on at least part of a surface of the gas flow channel.

17. A polymer electrolyte fuel cell in accordance with claim 16, wherein the metal oxide layer has a ratio of a metal element continuously varying in a direction of thickness from a side in contact with the metal plate to a surface of the metal oxide layer.

18. A polymer electrolyte fuel cell in accordance with claim 16, wherein the metal element included in the metal oxide layer is identical with a metal element that is a primary constituent of the metal plate.

19. A polymer electrolyte fuel cell in accordance with claim 17, wherein the metal element included in the metal oxide layer is identical with a metal element that is a primary constituent of the metal plate.

* * * * *